(12) United States Patent
Nelson et al.

(10) Patent No.: US 11,247,409 B2
(45) Date of Patent: Feb. 15, 2022

(54) METHODS OF CO-BONDING A FIRST THERMOSET COMPOSITE AND A SECOND THERMOSET COMPOSITE TO DEFINE A CURED COMPOSITE PART

(71) Applicants: The Boeing Company, Chicago, IL (US); Toray Industries, Inc., Tokyo (JP)

(72) Inventors: Karl M. Nelson, Issaquah, WA (US); Travis James Sherwood, Seattle, WA (US); Hardik Dalal, Seattle, WA (US); Felix N. Nguyen, Des Moines, WA (US); Dongyeon Lee, Puyallup, WA (US); Kenichi Yoshioka, Puyallup, WA (US); Hideo Andrew Koyanagi, Bellevue, WA (US)

(73) Assignees: The Boeing Company, Chicago, IL (US); Toray Industries, Inc., Tokyo (JP)

( * ) Notice: Subject to any disclaimer, the term of this patent is extended or adjusted under 35 U.S.C. 154(b) by 183 days.

(21) Appl. No.: 16/484,793

(22) PCT Filed: Mar. 15, 2018

(86) PCT No.: PCT/US2018/022748
§ 371 (c)(1),
(2) Date: Aug. 8, 2019

(87) PCT Pub. No.: WO2018/170330
PCT Pub. Date: Sep. 20, 2018

(65) Prior Publication Data
US 2020/0055261 A1   Feb. 20, 2020

Related U.S. Application Data

(60) Provisional application No. 62/472,404, filed on Mar. 16, 2017.

(51) Int. Cl.
*B32B 41/00* (2006.01)
*B29C 65/00* (2006.01)
(Continued)

(52) U.S. Cl.
CPC ........ *B29C 66/73753* (2013.01); *B29C 65/02* (2013.01); *B29C 65/48* (2013.01);
(Continued)

(58) Field of Classification Search
CPC ... B29C 66/73753; B29C 65/02; B29C 65/48; B29C 66/02242; B29C 66/028;
(Continued)

(56) References Cited

U.S. PATENT DOCUMENTS

| 5,207,956 A | 5/1993 | Kline et al. |
| 5,453,226 A | 9/1995 | Kline et al. |

(Continued)

FOREIGN PATENT DOCUMENTS

| CN | 104837605 | 8/2015 |
| CN | 105936131 | 9/2016 |

(Continued)

OTHER PUBLICATIONS

Machine-generated English translation of the abstract of FR 2675711, downloaded from Espacenet.com Aug. 6, 2019.
(Continued)

*Primary Examiner* — Michael N Orlando
*Assistant Examiner* — Joshel Rivera
(74) *Attorney, Agent, or Firm* — Dascenzo Gates Intellectual Property Law, P.C.

(57) ABSTRACT

Methods of co-bonding a first thermoset composite (TSC) and a second TSC to define a cured composite part are disclosed herein. The methods include partially curing the first TSC to a target state of cure (SOC) to define a first partially cured TSC. The partially curing is based, at least in
(Continued)

part, on a maximum temperature of the first TSC during the partially curing and on an elapsed time that an actual temperature of the first TSC is greater than a threshold temperature. The methods further include combining the first partially cured TSC with the second TSC to define a partially cured TSC assembly and heating the partially cured TSC assembly to bond the first partially cured TSC to the second TSC, cure the partially cured TSC assembly, and produce a cured composite part.

20 Claims, 9 Drawing Sheets

(51) Int. Cl.
    *B29C 65/02*     (2006.01)
    *B29C 65/48*     (2006.01)
    *B29L 31/30*     (2006.01)

(52) U.S. Cl.
    CPC ...... *B29C 66/028* (2013.01); *B29C 66/02242* (2013.01); *B29C 66/02245* (2013.01); *B29C 66/112* (2013.01); *B29C 66/131* (2013.01); *B29C 66/474* (2013.01); *B29C 66/72141* (2013.01); *B29C 66/73751* (2013.01); *B29C 66/73941* (2013.01); *B29C 66/91411* (2013.01); *B29C 66/91951* (2013.01); *B29L 2031/3076* (2013.01); *B29L 2031/3085* (2013.01)

(58) Field of Classification Search
    CPC ... B29C 66/112; B29C 66/131; B29C 66/474; B29C 66/72141; B29C 66/73751; B29C 66/73941; B29C 66/91411; B29C 66/91951; B29C 66/721; B29C 66/02241; B29C 66/73755; B29L 2031/3076; B29L 2031/3085; B29L 2031/3082
    USPC .................... 156/60, 64, 350, 351, 378, 379
    See application file for complete search history.

(56) References Cited

U.S. PATENT DOCUMENTS

| | | |
|---|---|---|
| 6,490,501 B1 | 12/2002 | Saunders |
| 8,834,668 B2 | 9/2014 | Nelson et al. |
| 9,051,062 B1 | 6/2015 | Boone et al. |
| 9,302,455 B1 | 4/2016 | Boone et al. |
| 2010/0298979 A1 | 11/2010 | Christopher et al. |
| 2012/0283348 A1 | 11/2012 | Akita et al. |
| 2014/0072775 A1 | 3/2014 | De Mattia |
| 2014/0144568 A1 | 5/2014 | MacAdams et al. |
| 2014/0216635 A1 | 8/2014 | Zahlen et al. |
| 2014/0302446 A1 | 10/2014 | Anderson et al. |
| 2014/0318693 A1 | 10/2014 | Nelson et al. |
| 2015/0056433 A1* | 2/2015 | MacAdams ......... B29C 65/5057 428/221 |
| 2016/0214328 A1 | 7/2016 | MacAdams et al. |
| 2016/0257427 A1 | 9/2016 | Humfeld et al. |
| 2016/0318214 A1 | 11/2016 | Pinillos Martinez et al. |

FOREIGN PATENT DOCUMENTS

| | | |
|---|---|---|
| EP | 1151850 | 11/2001 |
| EP | 1547753 | 6/2005 |
| EP | 2055464 | 5/2009 |
| EP | 3088152 | 11/2016 |
| FR | 2675711 | 10/1992 |
| KR | 10-2016-0045776 | 4/2016 |
| WO | WO 2012/002340 | 1/2012 |
| WO | WO 2014/081652 | 5/2014 |
| WO | WO 2015/026441 A1 | 2/2015 |

OTHER PUBLICATIONS

Machine-generated English translation of the abstract of WO 2012/002340, downloaded from Espacenet.com Aug. 6, 2019.

European Patent Office, International Search Report and Written Opinion for related PCT Application No. PCT/US2018/022748, dated Jun. 4, 2018.

European Patent Office, International Preliminary Report on Patentability and Written Opinion for related PCT Application No. PCT/US2018/022748, dated Sep. 17, 2019.

Machine-generated English language translation of the abstract of CN 104837605, downloaded from Esapcenet.com on Apr. 2, 2021.

Machine-generated English language translation of the abstract of CN 105936131, downloaded from Esapcenet.com on Apr. 2, 2021.

China National Intellectual Property Administration, Office Action and Search Report for related China Application No. 201880006154, dated Feb. 20, 2021.

English language translation of China National Intellectual Property Administration, Office Action and Search Report for related China Application No. 201880006154, dated Feb. 20, 2021.

Korean Intellectual Property Office Notice of Office Action for related Korea Patent Application No. 10-2019-7021885, dated Oct. 28, 2021.

English language translation of Korean Intellectual Property Office Notice of Office Action for related Korea Patent Application No. 10-2019-7021885, dated Oct. 28, 2021.

\* cited by examiner

METHODS OF CO-BONDING A FIRST THERMOSET COMPOSITE AND A SECOND THERMOSET COMPOSITE TO DEFINE A CURED COMPOSITE PART

RELATED APPLICATIONS

This application claims priority to U.S. Provisional Patent Application Ser. No. 62/472,404, which was filed on Mar. 16, 2017, entitled METHODS OF CO-BONDING A FIRST THERMOSET COMPOSITE AND A SECOND THERMOSET COMPOSITE TO DEFINE A CURED COMPOSITE PART, the complete disclosure of which is hereby incorporated by reference.

FIELD OF DISCLOSURE

The present disclosure relates generally to methods of co-bonding a first thermoset composite and a second thermoset composite to define a cured composite part, and more particularly to methods that include partially curing at least the first thermoset composite prior to the co-bonding.

BACKGROUND OF THE DISCLOSURE

Thermoset composites are utilized in a variety of parts, products, and/or industries. Materials for these thermoset composites may include resin-impregnated textiles, or fiber tows, (e.g., pre-preg) and/or dry fiber beds (e.g., pre-forms) that may be swept and/or injected with resin prior to cure. In either case, the resin, which also may be referred to herein as a thermosetting resin, may be latent, non-reactive, or at least substantially non-reactive at room, or ambient, temperatures.

Such thermoset composites generally are laid up while in a flexible, uncured state, which also may be referred to herein as a green state, and subsequently are heated. The heating cures the thermoset composite, such as by crosslinking the resin, and transitions the thermoset composite to a cured state. The crosslinking also may be referred to herein as polymerizing the resin.

In certain applications, such as the aerospace industry, cured thermoset composite parts, which may be fabricated from thermoset composites, may be extremely large. As examples, fuselage barrel sections of aircraft, wings of aircraft, and/or tail sections of aircraft may be formed from thermoset composites. Such large thermoset composite parts may require large layup mandrels for layup thereof and also may require large heating assemblies, such as autoclaves, ovens, and/or presses, to cure the thermoset composite part. The large layup mandrels and large heating assemblies are expensive and require a significant amount of factory space. As such, economical fabrication of the cured thermoset composite part dictates that the large layup mandrels and/or the large heating assemblies be utilized in an efficient manner.

Thermoset composite parts may be fabricated with a co-bonding process, in which a first thermoset composite and a second thermoset composite are combined to produce the thermoset composite part. In co-bonding processes, at least one of the thermoset composites generally is cured prior to combination with the other thermoset composite.

Prior art methods of curing a thermoset composite generally rely upon heating the uncured thermoset composite to above a threshold temperature for at least a threshold time to produce a cured thermoset composite part. Such methods, in nearly all instances, are designed to ensure complete, or nearly complete, curing of the thermoset composite, are a resource-intensive approach to curing the thermoset composite, and may not best utilize factory equipment and/or capacity. Stated another way, the prior art methods may cure the thermoset composite for longer than may be needed to produce desired and/or target mechanical properties within the thermoset composite, and there may be little benefit to this additional cure time.

Thus, these prior art methods may not best utilize factory resources, such as layup mandrels and/or heating assemblies, efficiently. This inefficient curing is especially evident when the thermoset composite subsequently is utilized in a co-bonding process, as the thermoset composite effectively may be cured twice. Thus, there exists a need for time-efficient methods of co-bonding a first thermoset composite and a second thermoset composite to define a cured composite part.

SUMMARY OF THE DISCLOSURE

Methods of co-bonding a first thermoset composite (TSC) and a second TSC to define a cured composite part are disclosed herein. The methods include partially curing the first TSC to a target state of cure (SOC) to define a first partially cured TSC. The partially curing is based, at least in part, on a maximum temperature of the first TSC during the partially curing and on an elapsed time that an actual temperature of the first TSC is greater than a threshold temperature. The methods also include combining the first partially cured TSC with the second TSC to define a partially cured TSC assembly. The partially cured TSC assembly includes an interface region between the first partially cured TSC and the second TSC. The methods further include heating the partially cured TSC assembly to bond the first partially cured TSC to the second TSC within the interface region, to cure the partially cured TSC assembly, and to produce a cured composite part.

DETAILED DESCRIPTION AND BEST MODE OF THE DISCLOSURE

Figure 1:
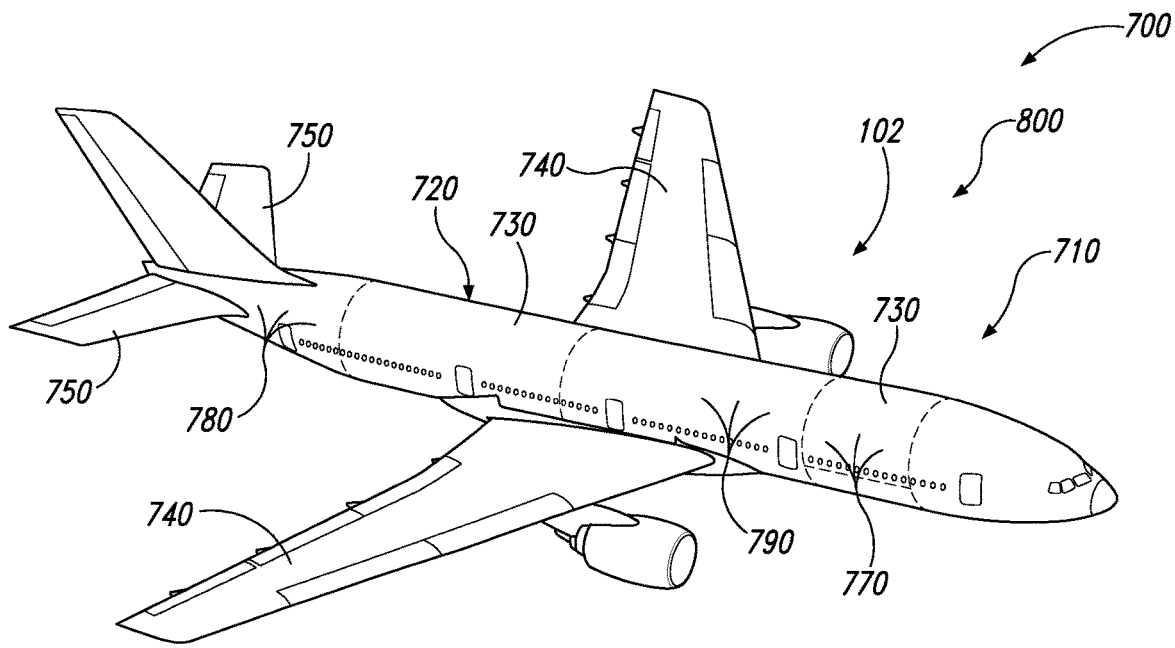
FIG. 1 is an example of an aircraft that includes a composite structure that may be formed using the systems and methods according to the present disclosure.

FIGS. 1-13 provide illustrative, non-exclusive examples of methods 150 and 200, according to the present disclosure, of thermoset composites that may be fabricated utilizing methods 150 and/or 200, of process flows for methods 150, and/or of data and/or information that may be generated and/or utilized during methods 150 and/or 200. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
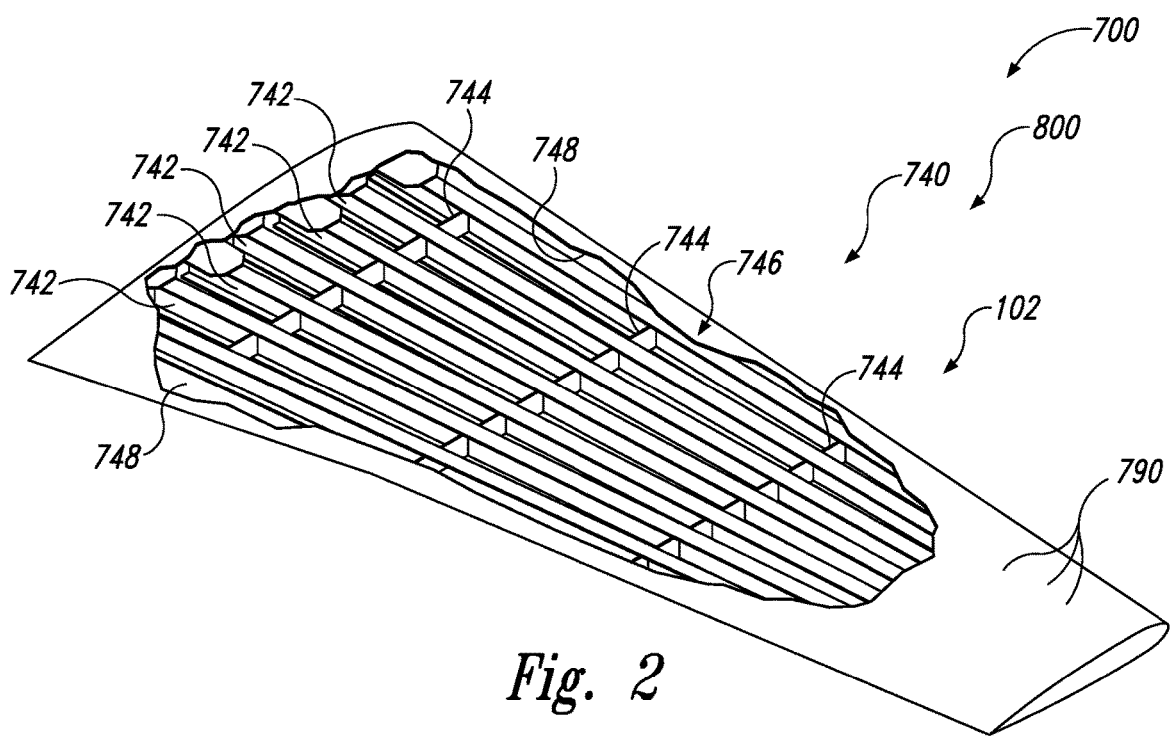
FIG. 2 is an example of a wing that may form a portion of the aircraft of FIG. 1.

FIG. 1 is an example of an aircraft 700 that includes a composite structure 800 that may include a cured thermoset composite part 100. Thermoset composite part 100 may be at least partially constructed from a thermoset composite and/or utilizing methods 150 and/or 200, according to the present disclosure. FIG. 2 is an example of a wing 740 that may form a portion of aircraft 700. Aircraft 700 may include a plurality of components, including an airframe 710, a fuselage 720, a fuselage barrel 730, wing 740, and/or a stabilizer 750.

Composite structure 800 of aircraft 700 may include a plurality of plies 102 of composite material, which may form cured thermoset composite part 100 and/or which may form a portion of any suitable component of aircraft 700. As an example, and as illustrated in FIG. 1, aircraft 700 may include skin segments 790 that may form, cover, and/or be an outer surface of any suitable portion of aircraft 700 and/or a plurality of stringers 770 that, together with a plurality of frames 780, may support an inner surface of skin segments 790. As another example, and as illustrated in FIG. 2, wing 740 may include a plurality of wing stringers 742, which may extend along a length of the wing. Wing 740 also may include a plurality of ribs 744. Wing stringers 742 and ribs 744 together may form and/or define at least a portion of an inner support structure 746 for wing 740, which may support an inner surface 748 of skin segments 790 that cover wing 740. These skin segments also may be referred to herein as wing skin segments 790. Skin segments 790 (or wing skin segments 790), stringers 770, frames 780, wing stringers 742, ribs 744, and/or inner support structure 746 may be at least partially, or even completely, formed from plies 102 of composite material and/or may be a cured thermoset composite part 100 that may be formed utilizing method 200 disclosed herein.

Figure 3:
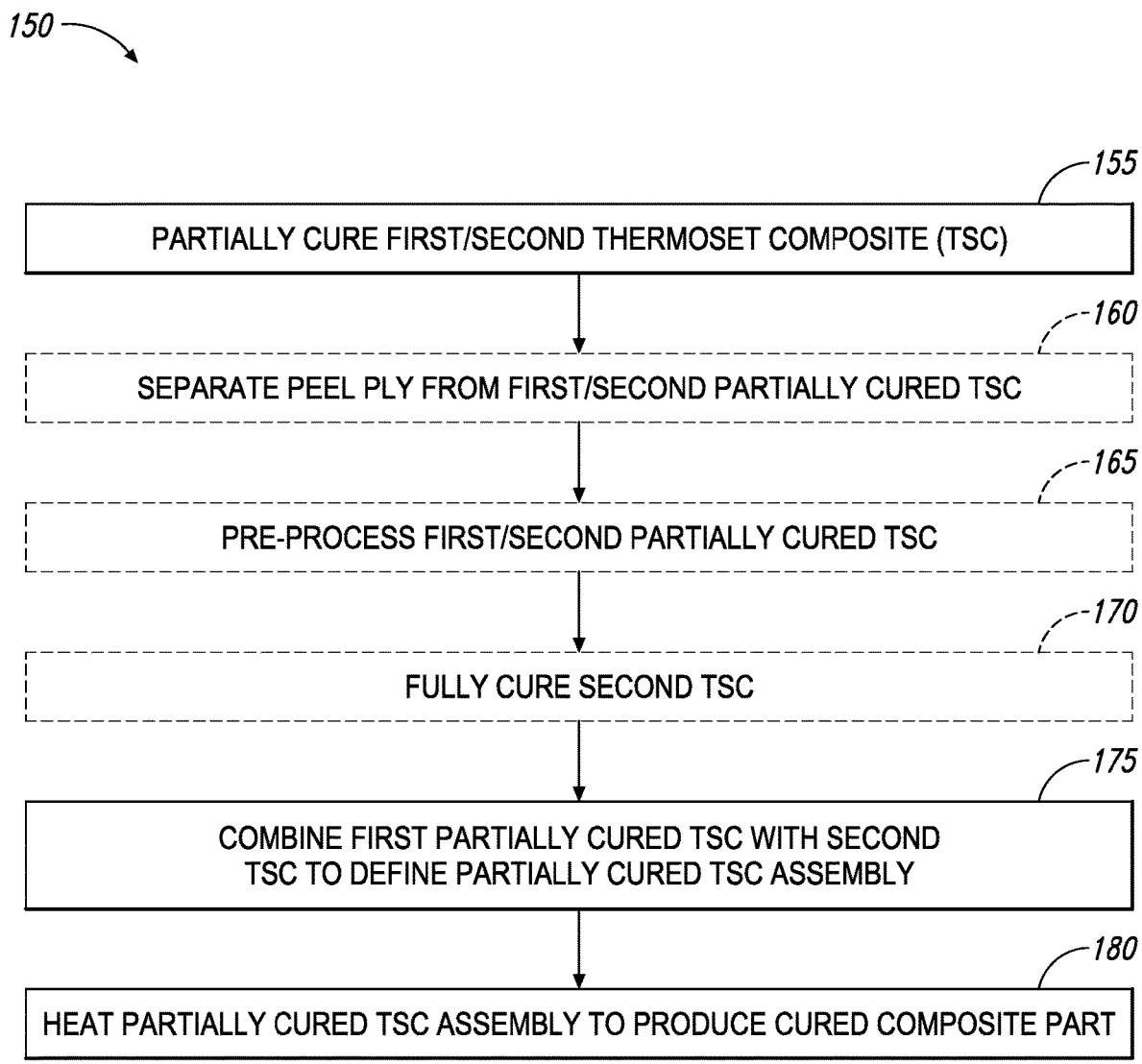
FIG. 3 is a flowchart depicting methods, according to the present disclosure, of co-bonding a first thermoset composite and a second thermoset composite to define a cured composite part.
Figure 4:
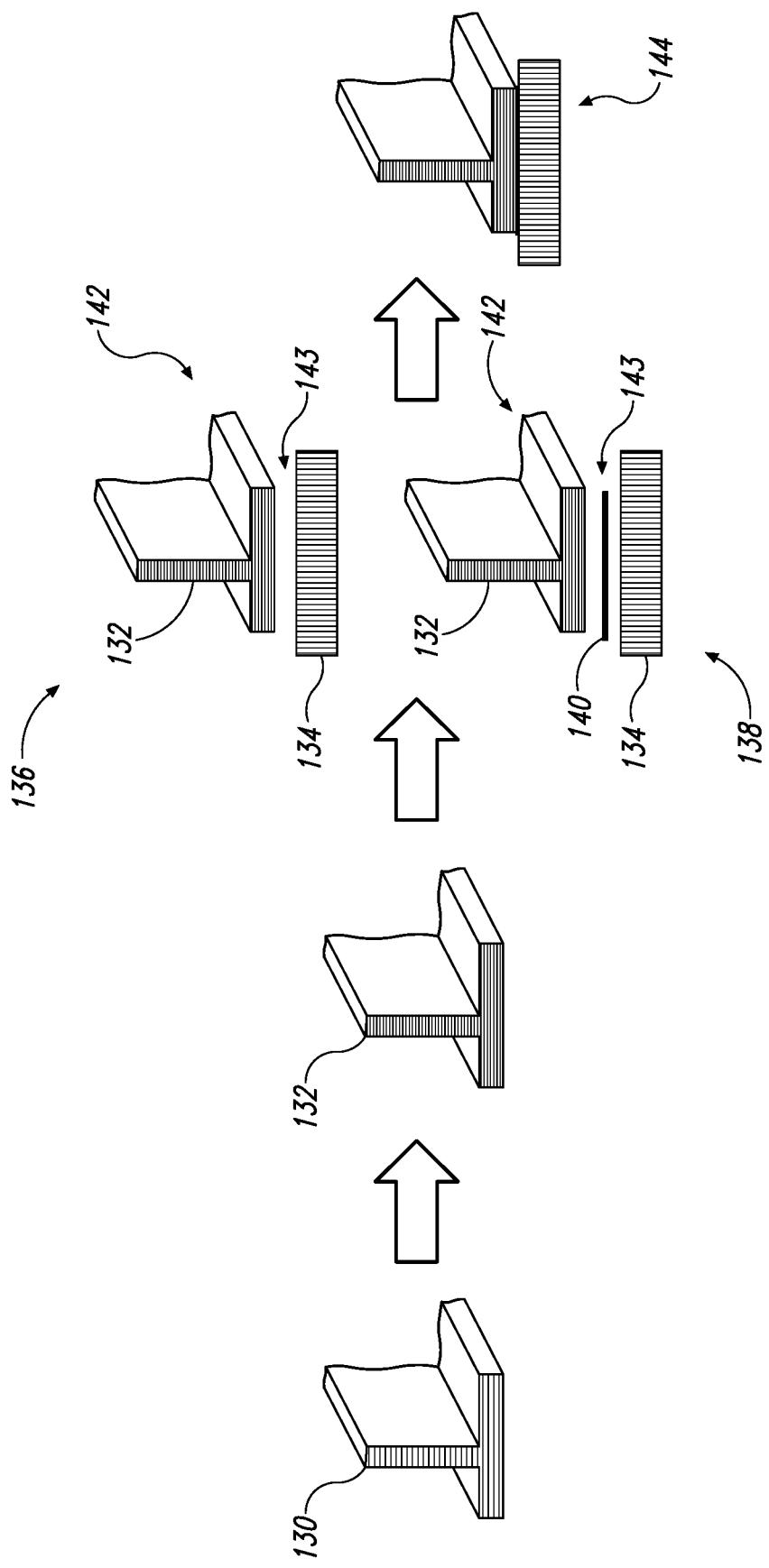
FIG. 4 is a process flow illustrating portions of the method of FIG. 3.

FIG. 3 is a flowchart depicting methods 150, according to the present disclosure, of co-bonding a first thermoset composite (TSC) and a second TSC (to one another) to form and/or define a cured composite part, while FIG. 4 is a process flow illustrating portions of the method of FIG. 3. Methods 150 include partially curing a first and/or a second TSC at 155 and may include separating a peel ply from the first and/or second TSC at 160. Methods 150 also may include pre-processing a first and/or second partially cured TSC at 165 and/or fully curing the second TSC at 170. Methods 150 further include combining the first partially cured TSC with the second TSC to define a partially cured TSC assembly at 175 and heating the partially cured TSC assembly to produce a cured composite part at 180.

Partially curing the first TSC and/or the second TSC at 155 may include partially curing to a desired and/or target state of cure (SOC) and/or partially curing to produce and/or generate a first partially cured TSC and/or a second partially cured TSC, respectively. The first TSC and/or the second TSC generally may be referred to herein as a TSC. The first partially cured TSC and/or the second partially cured TSC generally may be referred to herein as a partially cured TSC.

Figure 6:
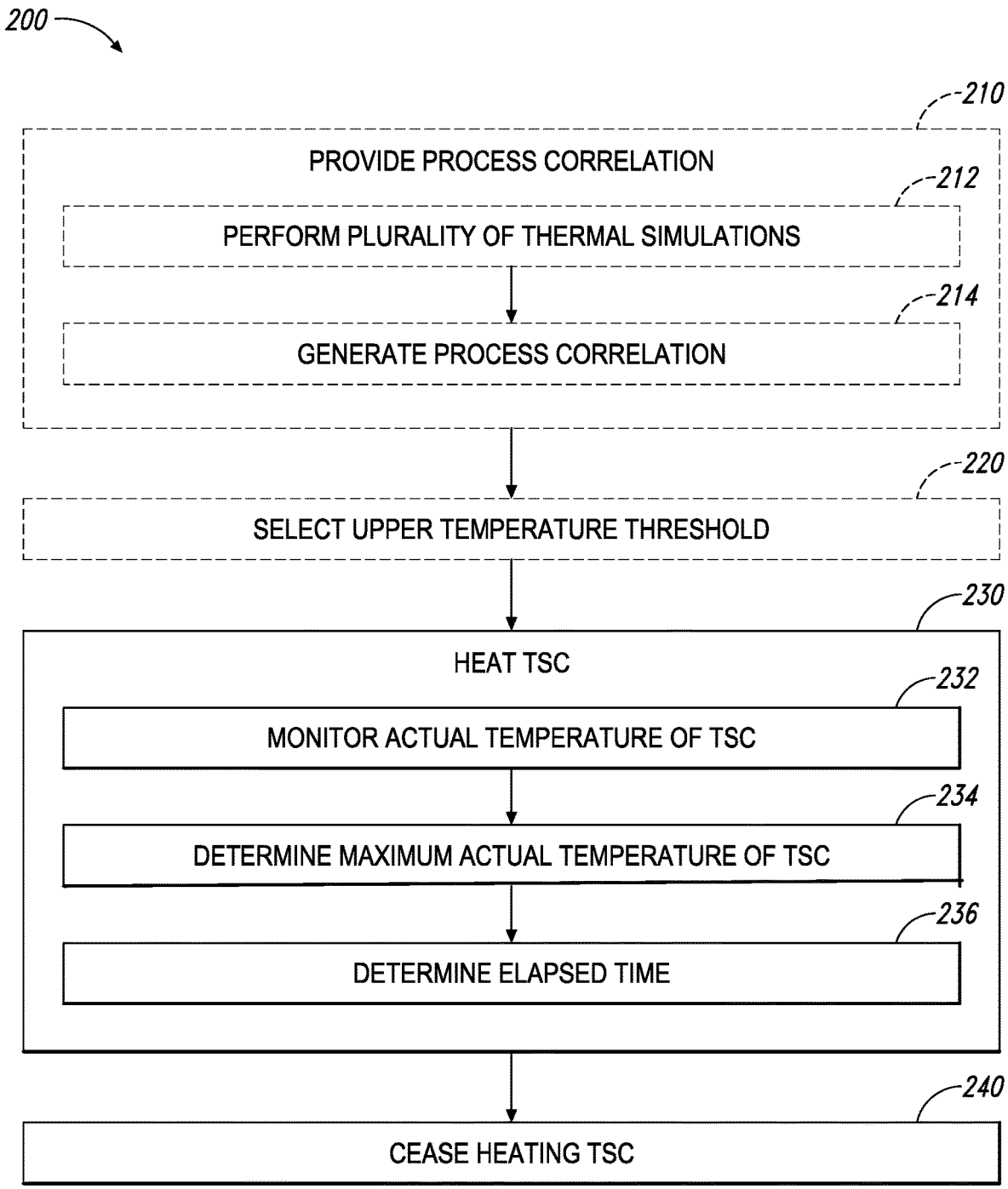
FIG. 6 is a flowchart depicting methods, according to the present disclosure, of curing a thermoset composite to a target state of cure.

The target SOC may be established, determined, and/or specified based, at least in part, on a maximum temperature, which is experienced during the partially curing at 155, of the first TSC and/or of the second TSC, respectively. The target SOC additionally or alternatively may be established, determined, and/or specified based, at least in part, on an elapsed time, during the partially curing at 155, that an actual temperature of the first TSC and/or of the second TSC, respectively, is greater than a threshold temperature. More specific examples of the partially curing at 155 are illustrated in FIG. 6 and discussed in more detail herein.

The partially curing at 155 is illustrated schematically in FIG. 4. Therein, an uncured TSC, as indicated at 130 is partially cured to form and/or define a partially cured TSC, as indicated at 132. In one example of methods 150, according to the present disclosure, the uncured TSC, which is indicated at 130 in FIG. 4, may include and/or be the first TSC and the partially cured TSC, which is indicated at 132 in FIG. 4, may include and/or be the first partially cured TSC.

Figure 5:
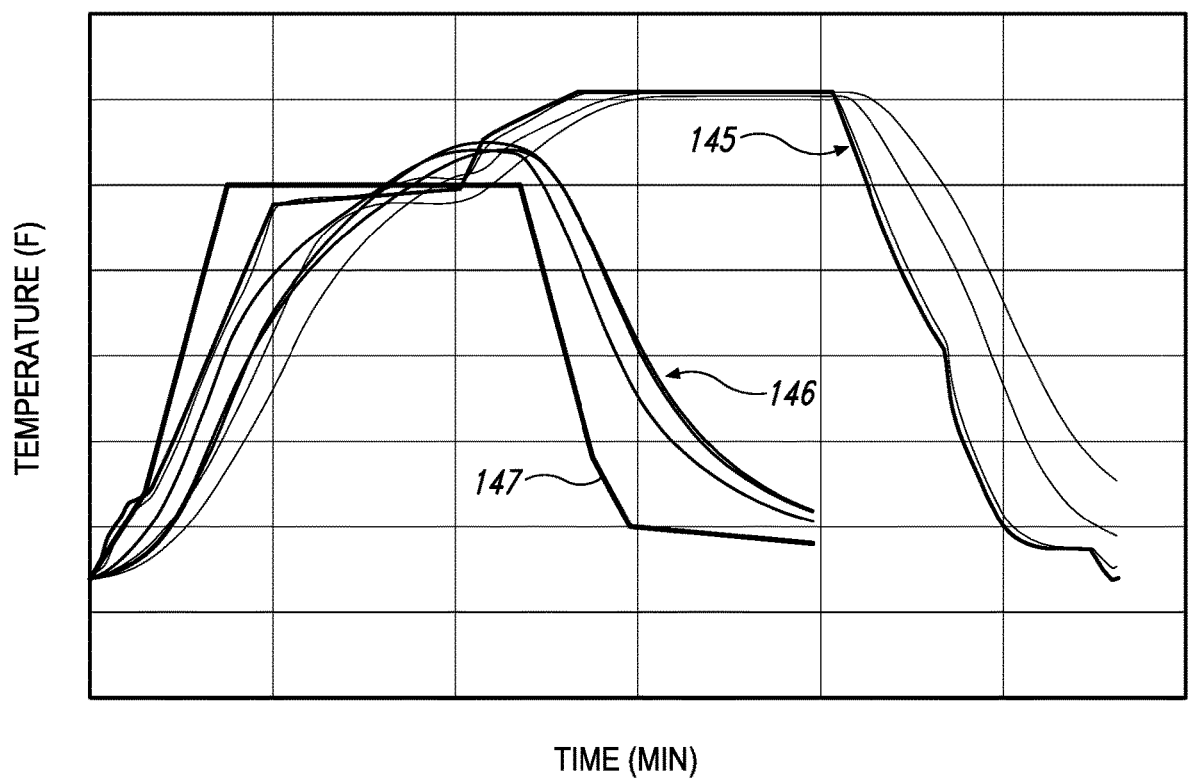
FIG. 5 compares a plurality of time-temperature trajectories, which may be utilized to fully cure a composite part, with a plurality of time-temperature trajectories, according to the present disclosure, which may be utilized to partially cure the composite part to a target state of cure.

Methods 200 that include the partially curing at 155 may take a significantly shorter amount of time when compared to prior art methods that fully cure the first TSC prior to the combining at 175. As an example of this time savings, FIG. 5 compares a plurality of time-temperature trajectories, which may be utilized to fully cure a thermoset composite, with a plurality of time-temperature trajectories, according to the present disclosure, which may be utilized to cure the TSC to the target SOC. Examples of common time-temperature trajectories utilized to fully cure the TSC are indicated in FIG. 5 at 145, while example time-temperature trajectories, according to the present disclosure, that partially cure the TSC are indicated at 146. An example of a temperature of a heated environment, which is utilized to produce trajectories 146, is indicated at 147. As illustrated, the time savings associated with utilizing methods 150 may be significant. As examples, the time savings may be at least 30%, at least 35%, at least 40%, at least 45%, at least 50%, at least 55%, and/or at least 60%. This time savings may result in more efficient equipment utilization, decreased manufacturing costs, decreased labor costs, and/or decreased utility costs when compared to the prior art methods.

The cured composite part may be included in and/or form a portion of any suitable thermoset composite part, such as thermoset composite part 100 of FIGS. 1-2, that may be formed, fabricated, and/or cured utilizing the methods disclosed herein. As an example, the first TSC, the second TSC, and/or the cured composite part may include a plurality of plies, or layers, of composite material. The plies may include and/or be formed from a plurality of fibers. The fibers may be coated with and/or impregnated by a thermosetting resin. Under these conditions, the TSC also may be referred to herein as a pre-impregnated, or pre-preg, material. However, other TSCs also are within the scope of the present disclosure. As an example, the TSC may include a dry fiber bed and/or a fabric that is coated, infused, and/or injected with the thermosetting resin.

Examples of the fibers include any suitable carbon fiber, polymeric fiber, glass fiber, organic fiber, inorganic fiber, aramid fiber, silicon fiber, metal fiber, aluminum fiber, boron fiber, tungsten carbide fiber, naturally occurring fiber, and/or man-made fiber. The fibers may be arranged, relative to one another, in any suitable manner. Examples include chopped fibers in a random orientation, a single tow, a narrow tow, woven fabrics, mats, knitted fabrics, bundles, and/or braids. The fibers may be long (e.g., over 10 millimeters in length) or short (e.g., less than 10 millimeters in length).

Examples of the thermosetting resin include any suitable resin that may be cured with a curing agent and/or crosslinking compound utilizing an externally applied source of energy to form and/or define a three-dimensional crosslinked network. Examples of thermosetting resins include a thermoset epoxy, a thermoset adhesive, a thermoset polymer, epoxy resins, epoxy novolac resins, ester resins, vinyl ester resins, cyanate ester resins, maleimide resins, bismaleimide resins, bismaleimide-triazine resins, phenolic resins, novolac resins, resorcinolic resins, unsaturated polyester resins, diallyl phthalate resins, urea resins, melamine resins, benzoxazine resins, polyurethanes, and/or mixtures thereof.

As discussed, prior art methods for curing uncured TSCs generally are configured to produce and/or generate a fully cured, or an at least substantially fully cured, TSC and may inefficiently cure the uncured TSC, thereby not best utilizing factory resources. This especially may be true of TSCs that are utilized as part of a co-bonding process, in which a first, fully cured, TSC is assembled with a second, uncured, TSC to produce a TSC assembly and the TSC assembly is cured a second time to produce a cured composite part and bond the first TSC and the second TSC together.

Stated another way, and while not required, the methods disclosed herein generally are utilized to cure an uncured TSC, such as the first TSC and/or the second TSC, to a target SOC that is different from the fully cured, or at least substantially fully cured, TSC of the prior art. Such a method, which may be referred to herein as producing and/or generating a partially cured TSC that has a target SOC, may be an intermediate step in a manufacturing process, such as the co-bonding process that is illustrated in FIGS. 3-4 and discussed herein. Methods 150 and/or 200, which are disclosed herein, may represent, or may be referred to herein as, lean, time-optimized, and/or time-conserving methods for curing the TSC and/or for producing the cured composite part.

The target SOC for the partially cured TSC also may be referred to herein as a cure state, as a target cure state, as a degree of cure, and/or as a target degree of cure for the partially cured TSC and may be defined in any suitable manner. As examples, the target SOC may be defined as, or by, a desired and/or target percentage of crosslinking within the resin that comprises the partially cured TSC and/or a desired and/or target percent reaction conversion of the resin. Examples of the target SOC include a SOC of at least 10%, at least 20%, at least 30%, at least 40%, at least 50%, at least 60%, at least 70%, at least 80%, at least 90%, at most 95%, at most 90%, at most 85%, at most 80%, at most 75%, at most 70%, at most 65%, at most 60%, at most 50%, and/or at most 40%. When the TSC has the target SOC, exposure to ultraviolet light may cause additional curing and/or degradation of the TSC. As such, the partially curing at 155 may include shielding the TSC, or the partially cured TSC, from ultraviolet light, such as to maintain the partially cured TSC at the target SOC and/or to protect the partially cured TSC from degradation. This shielding may be maintained at least prior to the combining at 175 and/or prior to the heating at 180.

As used herein, the phrases "uncured TSC" and/or "green TSC" may refer to a thermoset composite that is uncured, is at least substantially uncured, has not been purposefully cured, is in a flexible state, is in a state in which the thermoset composite may be laid up, molded, and/or shaped, has not been heated, and/or has less than a threshold percentage crosslinking within the resin that comprises the thermoset composite. As examples, the percentage crosslinking of the uncured TSC may be less than 20%, less than 15%, less than 10%, less than 5%, and/or less than 1%.

As used herein, the phrases "cured TSC" and/or "cured thermoset composite part" may refer to a thermoset composite that has been fully, or at least substantially fully, cured. As examples, a SOC of the cured TSC may be greater than that of the partially cured TSC and/or may be at least 80%, at least 85%, at least 90%, at least 95%, at least 99%, and/or at least substantially, or effectively, 100%.

As used herein, the phrase "partially cured TSC" may refer to a thermoset composite that has been partially cured to the target SOC utilizing the methods disclosed herein. As discussed in more detail herein, such a partially cured TSC may exhibit many physical characteristics of a cured TSC while, at the same time, exhibiting a corresponding SOC that is incomplete and/or less than the SOC of a comparable fully cured TSC.

As used herein, the phrase "thermoset composite" or the acronym "TSC" may refer to any suitable thermoset composite that has any suitable SOC. As such, the phrase "thermoset composite" and/or the acronym "TSC" generally may be utilized to refer to an uncured TSC, to a cured TSC, and/or to a partially cured TSC.

The methods disclosed herein generally are described as being applicable to thermoset composites, and examples of such thermoset composites are disclosed herein. However, it is within the scope of the present disclosure that these methods also may be applied to and/or utilized with bulk thermoset materials that are not, necessarily, composites. An example of such a bulk thermoset material is the resin that is utilized in the TSCs disclosed herein. With this in mind, the phrase "thermoset composite" and/or the acronym "TSC" may be replaced herein with the phrase "bulk thermoset material" without departing from the scope of the present disclosure.

The target SOC for the TSC may be selected and/or established such that the resultant partially cured TSC, which has been cured to the target SOC, is functionally similar to a comparable fully cured TSC, at least with respect to co-bonding processes that may be utilized to produce TSC assemblies. As an example, the partially cured TSC may exhibit similar mechanical properties to the comparable fully cured TSC, such as a rigidity, a hardness, and/or a modulus that is within 10%, within 5%, and/or within 1% of a rigidity, a hardness, and/or a modulus of the comparable fully cured TSC. As another example, the partially cured TSC may be a suitable replacement for the comparable fully cured TSC within a manufacturing process that utilizes the partially cured TSC and/or the comparable fully cured TSC. These similar mechanical properties may be sufficient to permit the partially cured TSC to function similarly, or even identically, to the comparable fully cured TSC in the context of co-bonding processes. However, these similar mechanical properties still may differ from properties of, or may not permit the partially cured TSC to be placed into operation in place of, the comparable fully cured TSC.

As a more specific example, the partially cured TSC may, without damage thereto, be treated in an identical manner to the comparable fully cured TSC during downstream processing thereof in a manufacturing environment. As additional examples, the partially cured TSC may be handled, trimmed, drilled, inspected, machined, and/or prepared for co-bonding in a manner that is similar, or even identical, to the comparable fully cured TSC.

In addition to the above-described mechanical and/or processing similarities between the partially cured TSC and the comparable fully cured TSC, the partially cured TSC may exhibit other beneficial, or even improved, characteristics when compared to the comparable fully cured TSC. As an example, the partially cured TSC may exhibit lower moisture absorption relative to the comparable fully cured TSC. As more specific examples, moisture absorption by the partially cured TSC may be 0.05 weight percent (wt %), 0.1 wt %, 0.15 wt %, and/or 0.2 wt % less than the moisture absorption exhibited by the comparable fully cured TSC, and this difference in moisture absorption may increase with a greater difference between the SOC of the partially cured TSC and the SOC of the comparable fully cured TSC.

It is within the scope of the present disclosure that the first TSC and/or the second TSC may include a peel ply that at least partially, or even completely, covers a region of the first TSC and/or of the second TSC, respectively. Such a region may extend within an interface region between the first TSC and the second TSC within the partially cured TSC assembly. Under these conditions, the partially curing at 155 may include partially curing while the peel ply covers the region of the first TSC and/or of the second TSC, respectively; and methods 150 further may include separating the peel ply from the first TSC and/or from the second TSC, respectively, as indicated at 160. When performed, the separating at 160 may be subsequent to the partially curing at 155 and/or prior to the combining at 175 and may include separating to permit direct physical contact between the first partially cured TSC and the second TSC during the combining at 175. The peel ply may be utilized to decrease environmental contamination of the interface region and/or to induce a surface activation and/or a surface texture within the interface region.

The peel ply may include and/or be a polymeric peel ply and/or a polyester peel ply. When the peel ply is utilized, an amount of residue and/or contamination present on the first and/or second partially cured TSC, upon removal of the peel ply, may be directly related, or proportional, to the maximum temperature and/or to the elapsed time. As such, the partially curing at 155 may include limiting the maximum temperature and/or limiting the elapsed time, such as to decrease a potential for contamination of the first and/or second partially cured TSC and/or of the interface region subsequent to separation of the peel ply and/or due to residue from the peel ply.

Pre-processing the first partially cured TSC and/or the second partially cured TSC at 165 may include pre-processing in any suitable manner and may be performed subsequent to the partially curing at 155 and prior to the combining at 175. Examples of the pre-processing at 165 include one or more of trimming the partially cured TSC, inspecting the partially cured TSC, machining the partially cured TSC, and/or drilling the partially cured TSC.

Another example of the pre-processing at 165 includes cleaning the partially cured TSC and/or cleaning the region of the partially cured TSC that extends within the interface region between the first partially cured TSC and the second TSC in the partially cured TSC assembly (e.g., the region where bonding between the first partially cured TSC and the second TSC occurs). Additional examples of the pre-processing at 165 include one or more of removing the peel ply from the region of the partially cured TSC, plasma etching the region of the partially cured TSC, sanding the region of the partially cured TSC, and/or solvent wiping the region of the partially cured TSC.

Fully curing the second TSC at 170 may include curing the second TSC to a fully, or at least substantially fully, cured SOC and may be performed prior to the combining at 175. Stated another way, the fully curing at 170 may include fully curing to produce and/or generate a second fully cured TSC. Under these conditions, the combining at 175 may include combining the first partially cured TSC with the second fully cured TSC to produce and/or generate the partially cured TSC assembly. Examples of the fully, or substantially fully, cured SOC include SOCs of at least 90%, at least 92.5%, at least 95%, at least 97.5%, or at least substantially 100%.

Combining the first partially cured TSC with the second TSC to define the partially cured TSC assembly at 175 may include combining any suitable number of partially cured TSCs with any suitable number of uncured, partially cured, and/or fully cured TSCs to form and/or define the interface region, which extends between the first partially cured TSC and the second TSC. The first partially cured TSC and the second TSC may contact, or directly contact, one another within the interface region.

It is within the scope of the present disclosure that the combining at 175 may include applying an adhesive to the interface region. However, this is not required, and it is also within the scope of the present disclosure that the combining at 175 may include combining without applying the adhesive to the interface region. Stated another way, and subsequent to the combining at 175, the interface region may be free of the adhesive extending between the first partially cured TSC and the second TSC.

The combining at 175 is illustrated schematically in FIG. 4. Therein, and as indicated at 136 and 138, partially cured TSC 132 may be combined with another TSC 134 to form and/or define a partially cured TSC assembly 142 that includes an interface region 143 extending between TSC 132 and TSC 134. As indicated at 136, interface region 143 may be free of an adhesive; however, and as indicated at 138, an adhesive 140 may extend within the interface region.

In one example of methods 150, according to the present disclosure, partially cured TSC 132 may include and/or be the first partially cured TSC, while the other TSC 134 may include and/or be the second TSC. It is within the scope of the present disclosure that the second TSC may have and/or define any suitable SOC during the combining at 175 and/or prior to the heating at 180. As an example, the second TSC may be uncured prior to the heating at 180. As another example, the second TSC may have less than a threshold SOC. Examples of the threshold SOC include threshold SOCs of less than 50%, less than 40%, less than 30%, less than 20%, less than 10%, less than 5%, and/or less than 1%.

As yet another example, methods 150 may include partially curing the second TSC, such as via and/or utilizing the partially curing at 155, prior to the combining at 175. Under these conditions, the second TSC may be partially cured to a second SOC to define the second partially cured TSC, and the second SOC may be the same as, or different from, the SOC of the first partially cured TSC. As another example, methods 150 may include fully curing the second TSC, such as by performing the fully curing at 170, prior to the combining at 175.

Heating the partially cured TSC assembly to produce the cured composite part at 180 may include heating to bond the first partially cured TSC to the second TSC within the interface region and/or to cure the partially cured TSC assembly. Stated another way, the heating at 180 may include heating to form and/or define the cured composite part, and the cured composite part may be an assembly, a cured assembly, and/or a bonded assembly of at least the first partially cured TSC and the second TSC. However, in the cured composite part, both the first partially cured TSC and the second TSC are fully cured. The heating at 180 may be performed in any suitable manner, including those that are discussed herein with respect to methods 200 of FIG. 6. An example of the cured composite part is illustrated in FIG. 4 at 144.

FIG. 6 is a flowchart depicting methods 200, according to the present disclosure, of curing thermoset composite (TSC), such as the first thermoset composite and/or the second thermoset composite of FIGS. 3-4, to a target state of cure (SOC). This may include curing to produce and/or generate a partially cured TSC, such as the first and/or second partially cured TSC of FIGS. 3-4. As discussed, methods 200 may be more detailed descriptions of the partially curing at 155, which is discussed herein with reference to FIG. 3. As such, the partially curing at 155 may include any suitable step and/or steps described herein with reference to methods 200. Similarly, methods 200 may include any suitable step and/or steps described herein with reference to the partially curing at 155.

Methods 200 may include providing a process correlation at 210 and/or selecting an upper temperature threshold at 220. Methods 200 include heating the thermoset composite (TSC) at 230 and ceasing heating at of the TSC at 240. The providing at 210 may include performing a plurality of thermal simulations at 212 and/or generating the process correlation at 214. During the heating at 230, methods 200 include monitoring an actual temperature of the TSC at 232, determining a maximum temperature of the TSC at 234, and determining an elapsed time that the TSC is above a threshold temperature at 236.

Providing the process correlation at 210 may include providing any suitable process correlation, or calibration, for the TSC and/or for curing of the TSC. The process correlation may describe a plurality of time-temperature trajectories, which may be taken by the TSC, to produce and/or generate the target SOC in the partially cured TSC. As an example, the process correlation may describe combinations of the elapsed time, as determined during the determining at 236, and the maximum temperature, as determined during the determining at 234, that produce and/or generate the target SOC within the partially cured TSC for a given threshold temperature.

The process correlation may differ with changes in the TSC, changes in the threshold temperature, and/or changes in the target SOC. Stated another way, the process correlation may be specific to a given TSC in a given configuration (e.g., a given TSC chemistry, a given TSC thickness, a given layup mandrel configuration, etc.), a given threshold temperature, and a given target SOC. Examples of the process correlation include a process correlation curve, which describes and/or illustrates a functional relationship between values of the maximum temperature and corresponding values of the elapsed time that produce the target SOC, a process correlation lookup table, which describes paired values of the maximum temperature and corresponding values of the elapsed time that produce the target SOC, and/or a process correlation function, which describes, or is fit to, the functional relationship between values of the maximum temperature and corresponding values of the elapsed time that produce the target SOC.

The threshold temperature may be selected and/or established in any suitable manner. As an example, the threshold temperature may be selected based, at least in part, on a composition, or a chemical composition, of the TSC. As another example, the threshold temperature may include, or be, a temperature above which crosslinking within the TSC occurs at a rate that is sufficient to permit processing, or curing, of the TSC within a reasonable, or economically viable, timeframe. As yet another example, the threshold temperature may include, or be, a minimum temperature for crosslinking of the TSC. As another example, the threshold temperature may include, or be, a temperature at which a resultant rate of cure, of the TSC, produces acceptable mechanical properties in the cured TSC and/or in the partially cured TSC. Examples of the threshold temperature include threshold temperatures of at least 70° C., at least 80° C., at least 90° C., at least 100° C., at least 110° C., at least 120° C., at least 130° C., at least 135° C., at least 140° C., at least 145° C., at least 150° C., at least 155° C., at least 160° C., at least 165° C., at least 170° C., at most 200° C., at most 195° C., at most 190° C., at most 185° C., at most 180° C., at most 175° C., at most 170° C., at most 165° C., at most 160° C., and/or at most 155° C.

The providing at 210 may include providing in any suitable manner. As examples, the providing at 210 may include deriving the process correlation from semi-empirical models of the TSC, from cure kinetics of the TSC, and/or from heat transfer models of the TSC. As another example, the providing at 210 may include deriving the process correlation experimentally, such as via curing the TSC to the target SOC under specified conditions and/or cure process parameters. Examples of the specified conditions and/or cure process parameters include the threshold temperature, the elapsed time, a temperature ramp, or change, rate, and/or the maximum temperature. When the providing at 210 includes deriving the process correlation experimentally, the SOC of the TSC also may be determined experimentally and/or in any suitable manner.

Figure 7:
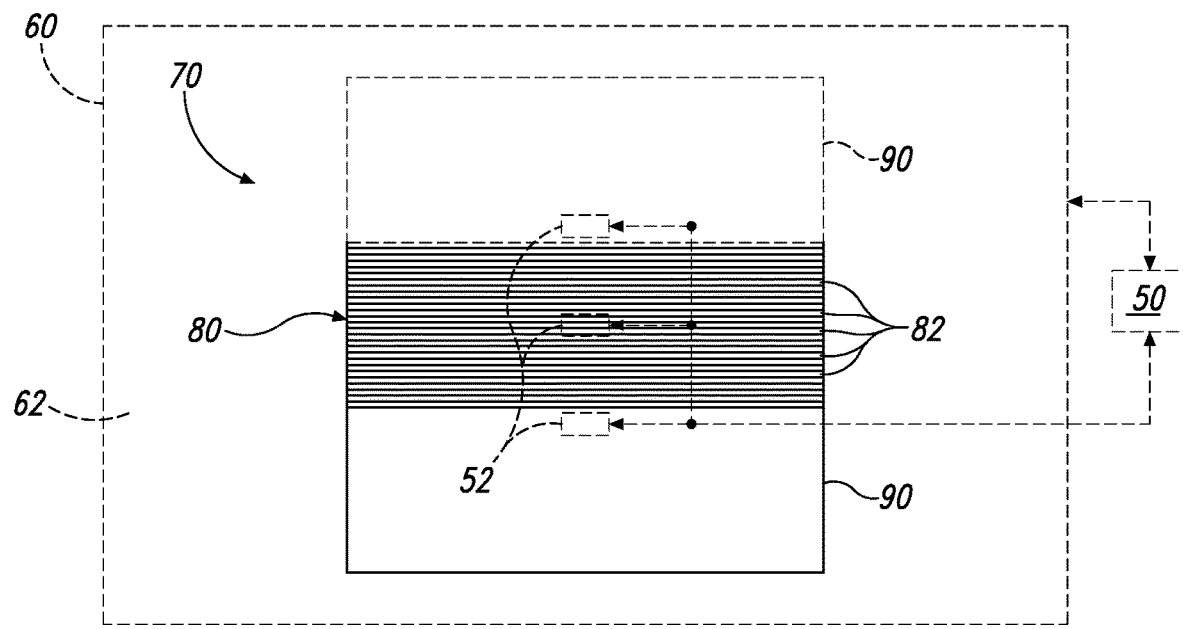
FIG. 7 is an example cross-sectional view of a model thermoset composite that may be utilized with the methods according to the present disclosure.

As a more specific example, the providing at 210 may include utilizing the performing at 212 and the generating at 214 to provide the process correlation. In such a method, a model simulation TSC may be provided and/or established. An example of such a model 70 of the TSC is illustrated in FIG. 7, in which a TSC, in the form of an uncured thermoset composite layup 80 including a plurality of plies 82, is positioned on a support, layup, and/or cure mandrel 90 or, as illustrated in dashed lines in FIG. 4, between two layup mandrels 90. As further illustrated in dashed lines in FIG. 7, methods 200 may include curing model 70 within a heating assembly 60, such as an oven and/or an autoclave. Heating assembly 60 may define a heated environment 62.

As illustrated in dashed lines in FIG. 7, a controller 50 may be adapted, configured, designed, constructed, and/or utilized to control the operation of heating assembly 60, such as via and/or utilizing methods 200, which are disclosed herein. As also illustrated in dashed lines in FIG. 7, one or more temperature detectors 52 may be utilized to monitor a temperature of thermoset composite layup 80. Temperature detectors 52, when present, may be configured to convey the temperature of the thermoset composite layup to controller 50; and controller 50 may control the operation of heating assembly 60 based, at least in part, on the temperature of the thermoset composite layup measured by temperature detectors 52. Heating assembly 60, heated environment 62, controller 50, temperature detectors 52, and/or model 70 also may be referred to herein as a system 40 for curing a thermoset composite.

The providing at 210 may be specific to a given and/or selected TSC. As such, changes in the TSC, or in the simulation model TSC, may produce, generate, and/or require a different process correlation. Examples of such changes in the TSC may include one or more of changes in the configuration of layup mandrels 90, presence and/or absence of layup mandrels 90, changes in a chemical composition of thermoset composite layup 80, changes in a number of plies 82 within thermoset composite layup 80, and/or changes in a thickness of thermoset composite layup 80.

The performing at 212 may include performing the plurality of thermal simulations on and/or utilizing the simulation model TSC. The plurality of thermal simulations includes kinetic models of the TSC and is performed for a plurality of distinct process conditions for curing of the TSC. Examples of the plurality of distinct process conditions for the TSC include one or more of a plurality of heated environment temperatures utilized during the heating at 230, a plurality of different heating rates for the TSC as utilized during the heating at 230, a plurality of different thicknesses for the TSC, a plurality of different heat transfer coefficients for the TSC, a plurality of different thicknesses for a support mandrel that supports the TSC during the heating at 230, and/or a plurality of different heat transfer coefficients for the support mandrel. The plurality of thermal simulations may be based, at least in part, on cure kinetics and/or on a heat transfer model of the TSC.

Figure 8:
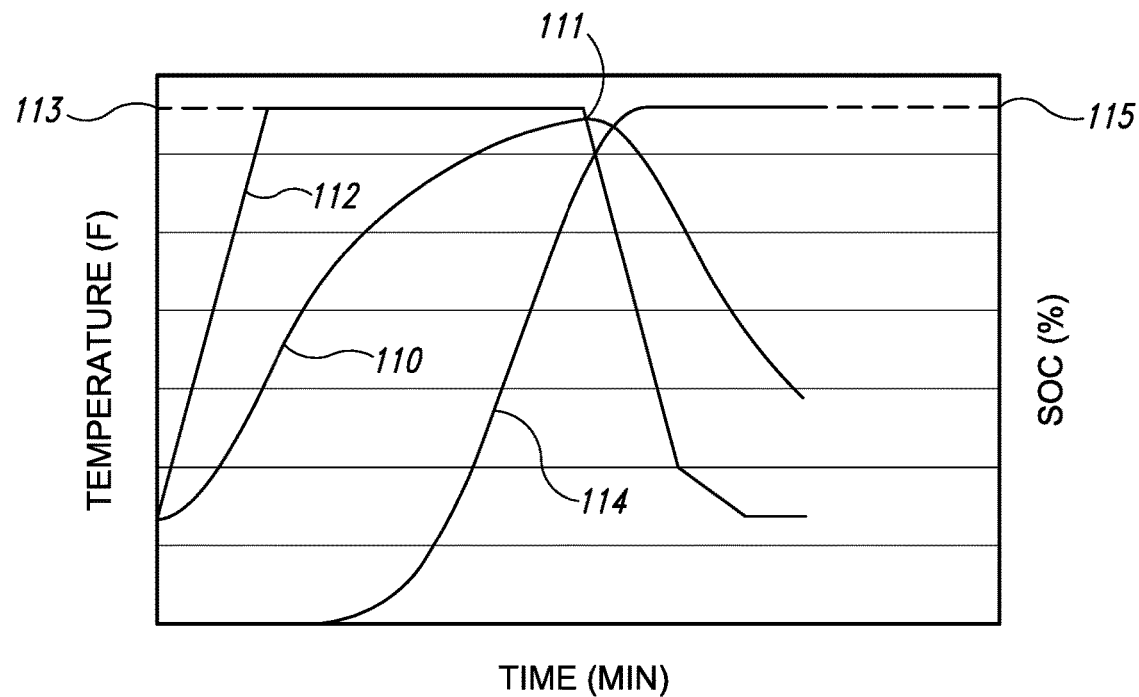
FIG. 8 is an example of temperature and degree of cure-time trajectory for the model thermoset composite of FIG. 7 under a specified set of process conditions.

An example of a single thermal simulation of the plurality of thermal simulations is illustrated in FIG. 8. Therein, a TSC temperature 110 of the TSC, an environment temperature 112 of the heated environment that is utilized to heat the TSC, and a SOC 114 of the TSC are plotted as a function of cure time. In the thermal simulation, the environment temperature is ramped to a steady-state temperature 113 and then maintained at the steady-state temperature for a period of time before decreasing. In response to heat transfer from the heated environment, TSC temperature 110 increases to a maximum temperature 111 and then decreases responsive to the decrease in environment temperature 112. Maximum temperature 111 also may be referred to herein as a maximum temperature 111 achieved by a real TSC during heating of the real TSC. Responsive to the overall heat cycle of the TSC, as represented by TSC temperature 110, SOC 114 of the TSC increases to a final SOC 115.

Figure 9:
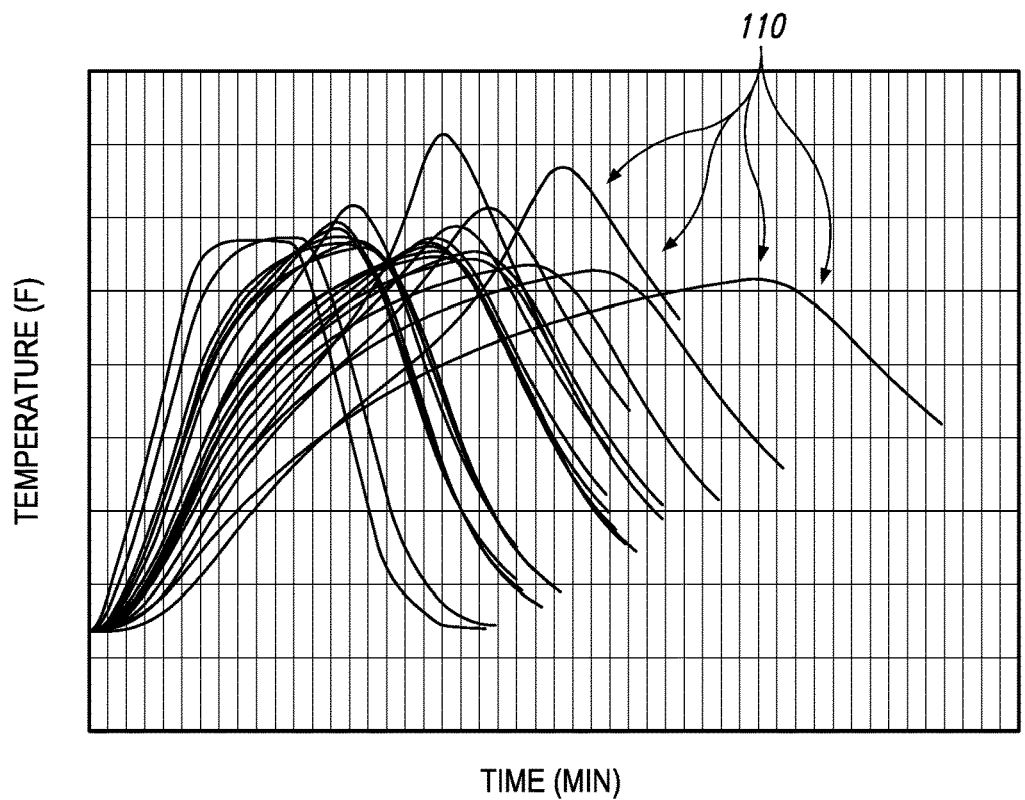
FIG. 9 is an example of a plurality of temperature-time trajectories generated for the model thermoset composite of FIG. 7 under a plurality of distinct process conditions, wherein each of the plurality of temperature time trajectories produces the same state of cure for the model thermoset composite.

FIG. 9 illustrates TSC temperature 110 as a function of time for a plurality of thermal simulations, including the thermal simulation of FIG. 8. To generate the various TSC temperature 110 curves illustrated in FIG. 9, the plurality of thermal simulations is performed for a variety of different materials for layup mandrels 90, for a variety of different thicknesses for layup mandrels 90, for a variety of different thicknesses for thermoset composite layup 80, and for a variety of different heat transfer coefficients between model TSC 70 of FIG. 7 and heated environment 62. Each of the illustrated thermal simulations takes the TSC of FIG. 7 to the same, to the desired, and/or to a target SOC (e.g., approximately 75%, as illustrated in FIG. 8). In addition, each of the illustrated thermal simulations is generated utilizing the same heating profile (e.g., as illustrated by environment temperature 112 of FIG. 8); however, this is not required, and it is within the scope of the present disclosure that the plurality of thermal simulations may utilize a plurality of different heating profiles.

Figure 10:
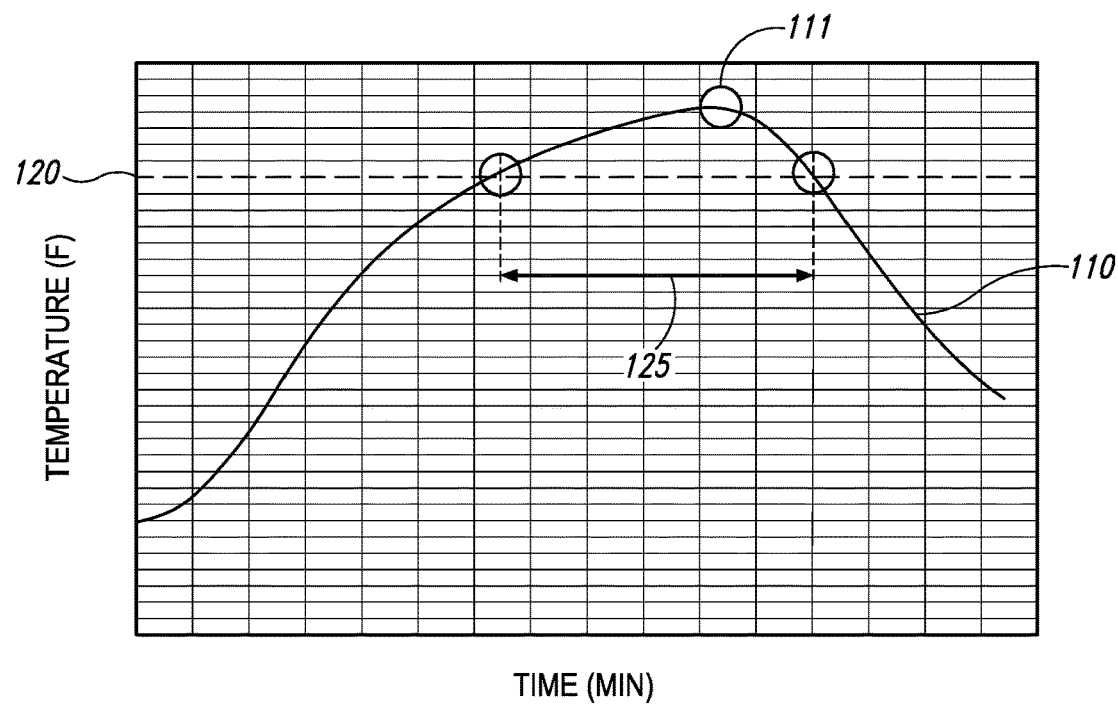
FIG. 10 is an example of a temperature-time trajectory for the model thermoset composite of FIG. 7 illustrating a threshold temperature, a maximum temperature, and an elapsed time that the actual temperature of the thermoset composite is greater than the threshold temperature for the model thermoset composite of FIG. 7.
Figure 11:
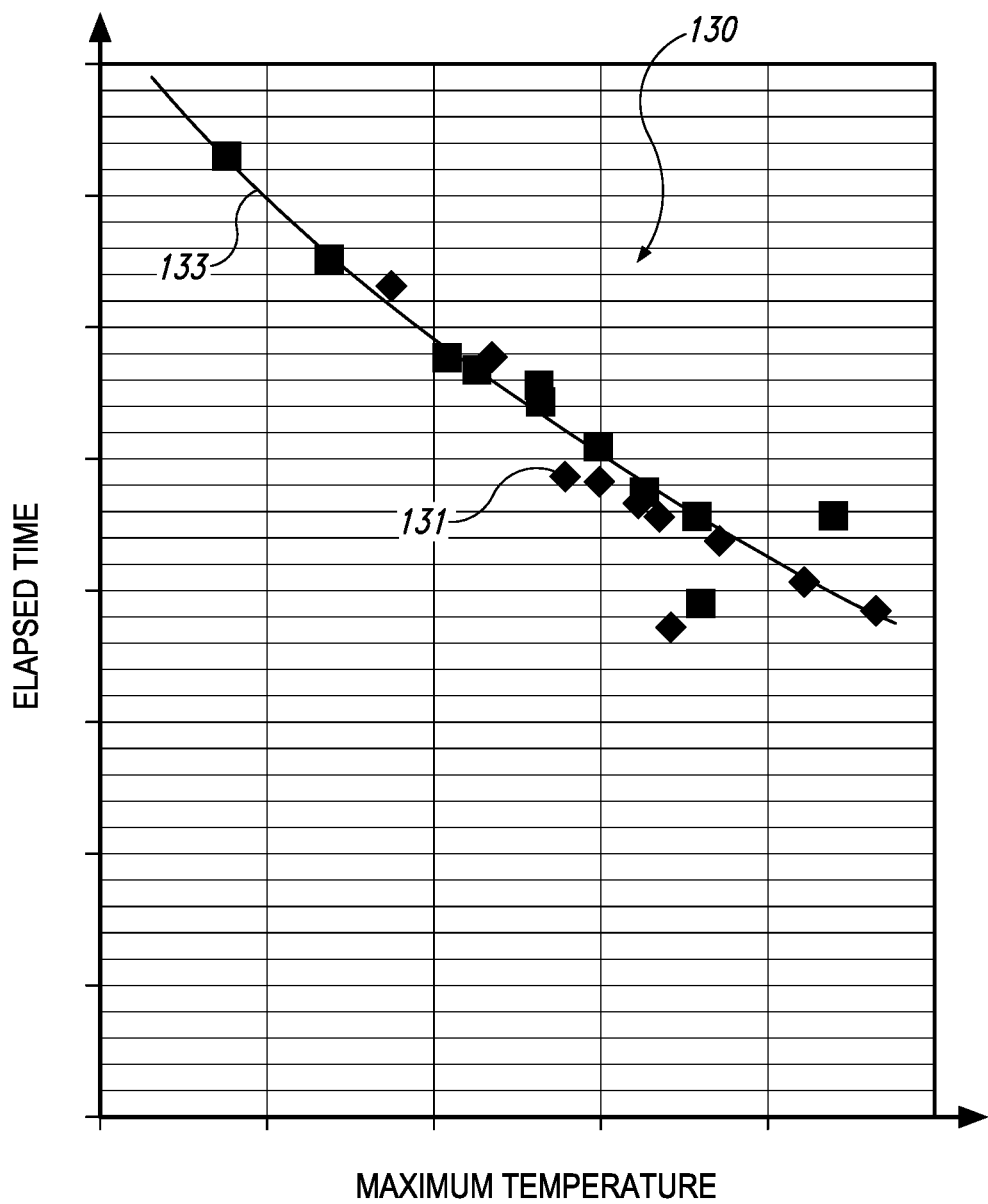
FIG. 11 is a plot of elapsed time vs. maximum temperature to generate a target state of cure for the model thermoset composite of FIG. 7.

Generating the process correlation at 214 may include utilizing information from each of the plurality of thermal simulations. As an example, and as illustrated in FIG. 10, the generating at 214 may include determining maximum temperature 111 and an elapsed time 125 above a threshold temperature 120 for each of the plurality of thermal simulations. As another example, and as illustrated in FIG. 11, the generating at 214 may include plotting the elapsed time as a function of maximum temperature for each of the plurality of thermal simulations. The plot of FIG. 11 then may be utilized as the process correlation, as indicated in FIG. 8 at 130. Such a process correlation may be created for a specific SOC, such as 75% in the example of FIG. 11.

Additionally or alternatively, the plot of FIG. 11 may be curve fit to provide a process correlation function 133, which is discussed herein, and/or the data utilized to generate the plot of FIG. 11 may be utilized to generate the process correlation lookup table, which is discussed herein. Process correlation function 133, when utilized, may include and/or define any suitable functional relationship between the elapsed time and the maximum temperature. Examples of process correlation function 133 include a linear function, a polynomial function, and/or an arcuate function.

Selecting the upper temperature threshold at 220 may include selecting any suitable upper temperature threshold for the TSC during the heating at 230. The selecting at 220 may be performed prior to the heating at 230; and when methods 200 include the selecting at 220, the heating at 230 may include maintaining the maximum temperature of the TSC below the upper temperature threshold.

Thermoset composites may undergo an exothermic reaction upon being heated and/or cured. This exothermic reaction, which also may be referred to herein as an exotherm, may cause the temperature of the TSC to increase, to rapidly increase, and/or to increase above a temperature of the heated environment that is utilized to heat the TSC. As such, the exothermic reaction may make it more difficult to control and/or regulate the temperature of the TSC; however, the upper temperature threshold may be selected to decrease a potential for and/or to avoid the exotherm, thereby permitting more accurate control of the temperature of the TSC and/or of the maximum temperature of the TSC that is experienced during the heating at 230.

Additionally or alternatively, certain downstream manufacturing steps, which may be performed utilizing the partially cured TSC subsequent to performing methods 200 on the TSC, may be impacted by the maximum temperature of the partially cured TSC that is achieved during the heating at 230 and/or by the elapsed time that the TSC is above the threshold temperature. As an example, and when the TSC is utilized in a co-bonding process, a bond strength between the TSC and an uncured TSC may be negatively impacted by high temperatures, experienced by the TSC, during the heating at 230. Thus, the selecting at 220 may be utilized to improve the bond strength experienced in the co-bonding process.

Heating the TSC at 230 may include heating the TSC in any suitable manner and/or utilizing any suitable structure and/or structures. As examples, the heating at 230 may include one or more of heating via convective heat transfer to the TSC, heating via conductive heat transfer to the TSC, and/or heating via radiative heat transfer to the TSC. As more specific examples, the heating at 230 may include heating within a heating assembly, such as heating assembly 60 of FIG. 7, and/or heating a support mandrel, such as layup mandrel 90 of FIG. 7, that supports the TSC during the heating at 230.

As another example, the heating at 230 may include heating within a heated environment that surrounds the TSC, such as heated environment 62 of FIG. 7, by increasing a temperature of the heated environment. As yet another example, the heating at 230 may include exposing the TSC to a heat source and/or applying thermal energy to the TSC with, via, and/or utilizing the heat source. Under these conditions, the ceasing at 240 may include ceasing application of the thermal energy to the TSC with the heat source.

When the heating at 230 includes heating with the heat source, the heating at 230 further may include ramping a temperature of the heat source to a soak, or steady state, temperature, such as steady-state temperature 113 of FIG. 8 and maintaining the temperature of the heat source at the steady-state temperature for a threshold soak time. The steady-state temperature is greater than the threshold temperature; and, when methods 200 include the selecting at 220, the steady-state temperature may be less than the upper temperature threshold. Examples of the steady-state temperature include steady-state temperatures of at least 80° C., at least 90° C., at least 93.3° C., at least 100° C., at least 110° C., at least 120° C., at least 130° C., at least 140° C., at least 150° C., at least 160° C., at least 170° C., at least 179.4° C., at least 180° C., at least 190° C., at least 200° C., at most 250° C., at most 225° C., at most 200° C., at most 190° C., at most 180° C., at most 170° C., at most 160° C., at most 150° C., at most 140° C., at most 130° C., at most 120° C., at most 110° C., at most 100° C., and/or at most 95° C.

As discussed, and during the heating at 230, methods 200 include monitoring the actual temperature of the TSC at 232, determining the maximum temperature of the TSC at 234, and determining the elapsed time that the TSC is above, or greater than, the threshold temperature at 236. Monitoring the actual temperature of the TSC at 232 may include monitoring with, via, and/or utilizing a temperature detector, such as temperature detectors 52 of FIG. 7. Examples of the temperature detector include, but are not limited to, a thermocouple, a resistance thermal detector (RTD), and/or an infrared (IR) temperature sensor.

It is within the scope of the present disclosure that the monitoring at 232 may include monitoring a select temperature of a select, specified, and/or predetermined location on the TSC, monitoring an average temperature of the TSC, and/or monitoring a lowest temperature of the TSC. Additionally or alternatively, the monitoring at 232 also may include monitoring a plurality of actual temperatures of the TSC at a plurality of spaced-apart locations on the TSC. The actual temperature of the TSC also may be referred to herein as and/or may be a part temperature, a part temperature of the TSC, a temperature of the TSC, a measured temperature of the TSC, and/or a monitored temperature of the TSC. It is within the scope of the present disclosure that the actual temperature of the TSC may be measured, or directly measured, on the TSC, such as via direct thermal contact between the temperature detector and the TSC. Additionally or alternatively, it is also within the scope of the present disclosure that the actual temperature of the TSC may be indirectly measured, calculated, and/or inferred, such as via knowledge of the temperature of the heated environment that surrounds the TSC.

Determining the maximum temperature of the TSC at 234 may include measuring and/or determining the maximum temperature achieved by the TSC during the heating at 230. When the monitoring at 232 includes monitoring a single location and/or an average temperature of the TSC, the maximum temperature may be the maximum temperature at the single location and/or the maximum of the average temperature of the TSC. Alternatively, when the monitoring at 232 includes monitoring at the plurality of spaced-apart locations on the TSC, the maximum temperature of the TSC may include, or be, a lowest monitored temperature of the TSC as measured at a lowest temperature location of the plurality of spaced-apart locations on the TSC. Such a lowest monitored temperature also may be referred to herein as a lagging temperature of the TSC and/or as a temperature of a lagging temperature detector. The lowest monitored temperature may represent the temperature of the least-cured location of the plurality of spaced-apart locations on the partially cured TSC. As such, a SOC at the location of the lowest monitored temperature may be a least, or lowest, SOC of the partially cured TSC across the plurality of spaced-apart locations on the partially cured TSC.

Determining the elapsed time that the TSC is above, or greater than, the threshold temperature at 236 may include determining a time period, or an elapsed time, that begins when the actual temperature of the TSC exceeds the threshold temperature and ends when the ceasing is initiated. An example of this elapsed time is illustrated in FIG. 10 and discussed in more detail herein with reference thereto. In general, FIG. 10 illustrates an entirety of a time that the temperature of the TSC exceeds the threshold temperature. Since it may take a finite amount of cooling time for the TSC to cool to below the threshold temperature subsequent to the ceasing at 240, the entire time that the temperature of the TSC exceeds the threshold temperature may be greater than the elapsed time that is determined during the determining at 236. Additionally or alternatively, the determining at 236 may include an estimate of the cooling time and thus may estimate a total elapsed time as a sum of the estimated cooling time and the time period that begins when the actual temperature of the TSC exceeds the threshold temperature and ends when the ceasing is initiated.

Ceasing heating of the TSC at 240 may include ceasing based, at least in part, on the maximum temperature of the TSC, such as is determined during the determining at 234, and on the elapsed time, such as is determined during the determining at 236. As an example, the ceasing at 240 may include ceasing, or initiating the ceasing, based, at least in part, on a relationship between the maximum temperature of the TSC and the elapsed time. An example of such a relationship is illustrated in FIG. 11 and discussed in more detail herein with reference thereto.

As a more specific example, and when methods 200 include the providing at 210, the ceasing at 240 may include ceasing responsive to the process correlation indicating that the TSC has reached, or will reach, the target SOC (e.g., that the TSC is the partially cured TSC). As another more specific example, and when methods 200 include the providing at 210, the ceasing at 240 may include ceasing responsive to the elapsed time exceeding a threshold elapsed time, for the maximum temperature of the TSC, that produces the target SOC. As yet another example, and when methods 200 include the providing at 210, the ceasing at 240 may include ceasing responsive to the maximum temperature exceeding a threshold maximum temperature, for the current elapsed time, that produces the target SOC.

The ceasing at 240 may include ceasing in any suitable manner. As an example, the ceasing at 240 may include ceasing application of heat to the TSC. As another example, the ceasing at 240 may include decreasing the temperature of the heated environment that surrounds the TSC during the heating at 230.

Methods 150 and/or 200, which are disclosed herein, may provide several significant benefits over prior art methods for curing and/or co-bonding TSCs. As an example, and as discussed, prior art methods generally are configured to completely, or at least substantially completely, cure a thermoset composite by ensuring that the thermoset composite is above a threshold temperature for at least a threshold time. As such, these prior art methods disregard a maximum temperature that is achieved by the thermoset composite, disregard a temperature trajectory that is taken by the thermoset composite during the curing process, and/or disregard when a peak exotherm temperature of the thermoset composite exceeds an upper threshold temperature. As discussed, this generally results in, or requires, inefficient curing of the thermoset composite (e.g., curing for longer than needed to produce desired and/or target mechanical properties) and introduces inefficiencies into the curing process.

In contrast, methods 150, which are disclosed herein, are configured to co-bond a first partially cured TSC with a second TSC. As discussed, the first partially cured TSC is not fully cured, which may significantly decrease an overall time required to form and cure the cured composite part. An example of this time savings is illustrated in FIG. 5 and discussed herein with reference thereto. As discussed, the decrease in curing time for the first partially cured TSC may be approximately 50%. As also discussed, and when a peel ply is utilized to protect the interface region between the first partially cured TSC and the second TSC, the first partially cured TSC generally will exhibit less residue and/or contamination in the interface region when compared to prior art methods of co-bonding. Thus, methods 150 may permit co-bonding of the first TSC and the second TSC without a need for cleaning the interface region therebetween and/or may produce a stronger cured composite part when compared to prior art co-bonding methods. Methods 150 and 200, which are disclosed herein, are configured to cure the TSC to any suitable SOC, including a SOC that is less than fully cured. Methods 150 and 200 control the curing process based upon both the elapsed time above the threshold temperature and the maximum temperature of the TSC and thus consider the temperature trajectory taken by the TSC during the curing process. This consideration of the temperature trajectory provides the additional information needed to cure the TSC to the target SOC reproducibly and/or without inefficiently curing the TSC. Methods 150 and/or 200 also permit the curing time to be adjusted, during the curing process, responsive to unexpected events such as heat disruption due to power outages, etc.

Figure 12:
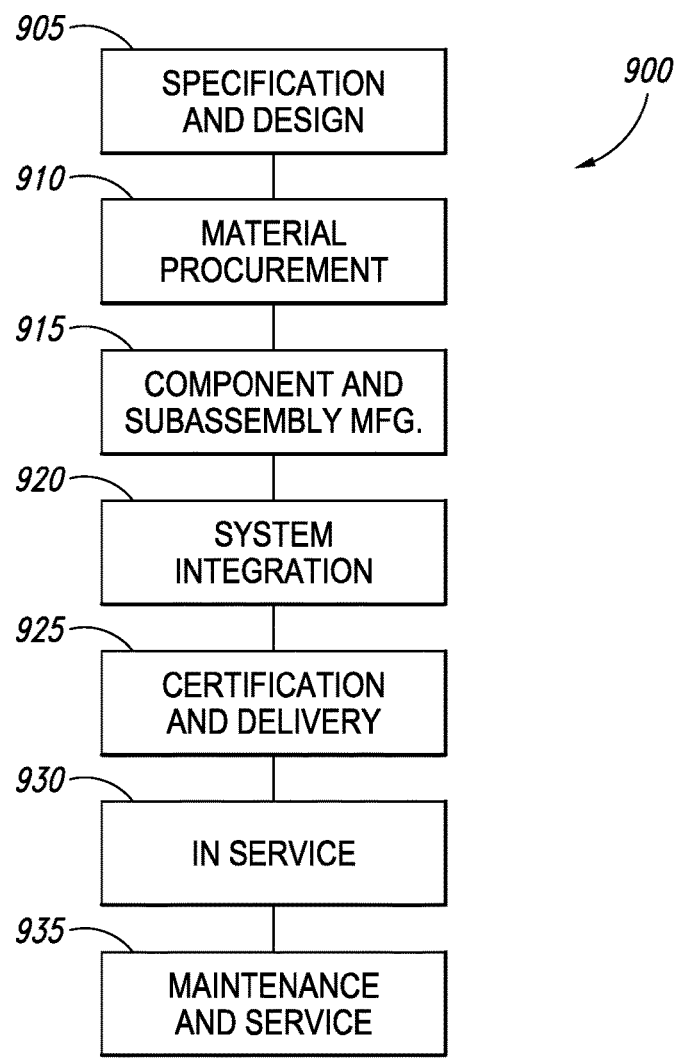
FIG. 12 is a flow diagram of aircraft production and service methodology.
Figure 13:
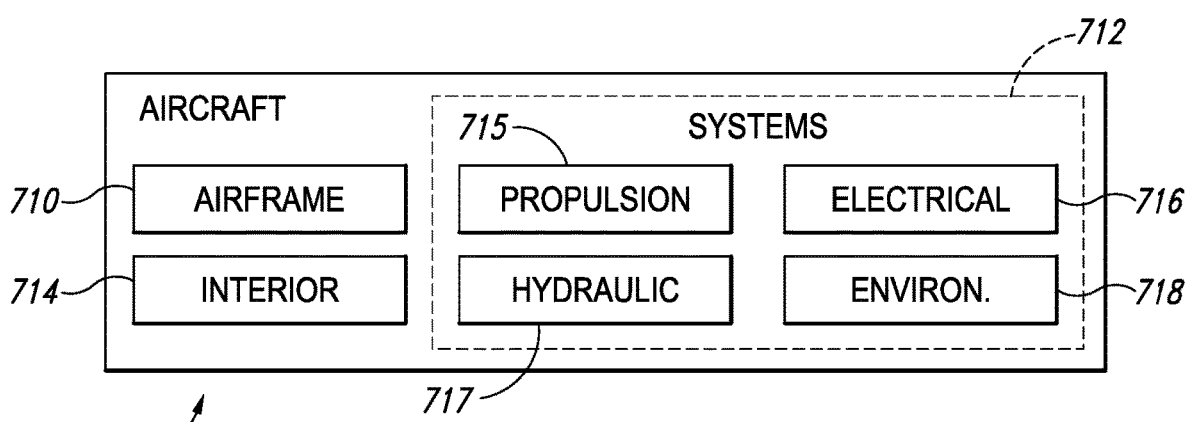
FIG. 13 is a block diagram of an aircraft.

Referring now to FIGS. 12-13, embodiments of the disclosure may be described in the context of an aircraft manufacturing and service method 900, as shown in FIG. 12, and/or an aircraft 700, as shown in FIG. 13. During preproduction, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more of system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, during maintenance and service 935.

Next, the present disclosure is described in the context of working examples. In these working examples, a SOC of 90% or greater is considered, is utilized to model, and/or is utilized to approximate a fully cured TSC. In contrast, a SOC of less than 90% is considered, is utilized to model, and/or is utilized to approximate a partially cured TSC. Such model partially cured TSCs and model fully cured TSCs collectively may be referred to herein as resulting TSCs.

In a first working example, several uncured thermoset composite layups 80 were formed from a plurality of plies 82 and a polyester dry peel ply including a fabric of polyester fibers without a resin was applied to the surface of each uncured thermoset composite layup 80. Uncured thermoset composite layups 80 then were cured to various states of cure, ranging from 70% to 90%. The resulting TSCs were subject to two different quantitative tests.

First, a climbing drum peel test (according to ASTM D1781) was used to measure a peel-off force of the peel ply from the resulting TCSs. The peel force for the samples that were cured to a 90% SOC exhibited a peel force that was approximately 35% higher than the peel force observed for the samples that were cured to a 70% SOC. This result suggests that a higher SOC produces greater bonding between the TSC and the peel ply, which may make it more difficult to remove the peel ply and/or may suggest greater contamination of the TSC by the peel ply.

Second, time-of-flight secondary ion mass spectroscopy (TOF-SIMS) and X-ray photoelectron spectroscopy (XPS) were utilized to measure residual polyester components of the peel ply on the resulting TSCs subsequent to separation of the peel ply from the resulting TSCs. The TOF-SIMS and XPS results both indicate that the samples that were cured to a 90% SOC exhibit 3-4 times more polyester residual when compared to the samples that were cured to a 70% SOC. This result further suggests that there is greater risk of contamination of the TSC, by the peel ply, when the TSC is taken to a greater SOC. This decrease in contamination is expected to minimize any need for subsequent surface preparation and to provide improved bonding for the co-bonding process disclosed herein, when compared to prior art co-bonding processes. This decrease in contamination also may facilitate co-bonding processes that do not utilize an adhesive between adjacent TSCs.

In a second working example, which illustrates methods 200, a process correlation, such as process correlation 130 of FIG. 11, was utilized to select a process condition 131 that provides a maximum temperature and a corresponding elapsed time that will produce a target SOC for a TSC. In the working example, process condition 131 corresponds to a maximum temperature of 326.7° F. (163.7° C.) and an elapsed time of 104 minutes. Process correlation 130 of FIG. 11, which is based on the model simulations, is expected to provide conditions under which a SOC for the TSC is approximately 75%.

Subsequently, a TSC was placed within an autoclave. A heat cycle was performed in which environment temperature 112 within the autoclave was ramped from ambient up to steady-state temperature 113 of approximately 340° F. (171° C.) before being ramped back down to ambient. Concurrently, TSC temperature 110 was monitored and, responsive to the increase in environment temperature 112, TSC temperature 110 increased to a maximum temperature 111 of 326.7° F. (163.7° C.). In addition, the TSC remained above a threshold temperature 120 of 280° F. (138° C.), as illustrated in FIG. 10, for an elapsed time 125 of 104 minutes. This heat cycle cured the TSC to a SOC of approximately 74.7%.

In a third working example, several uncured thermoset composite layups 80 were formed from a plurality of plies 82. Uncured thermoset composite layups 80 then were cured to various states of cure, ranging from 70% to 90%. The resulting TSCs were subject to various factory handling and/or machining operations, including drilling and trimming. The quality of the machined surface, the quality of the drilled holes, and the wear lifetime for the machine tools utilized in the experiments on the resulting TSCs were all found to be within acceptable factory limits as defined for factory handling and/or machining operations performed on fully cured TSCs.

In a fourth working example, uncured thermoset composite layups 80 were formed from a plurality of plies 82. The uncured thermoset composite layups 80 then were cured to varying states of cure, and the resulting TSCs were subjected to several mechanical property tests.

In a first mechanical property test, the uncured thermoset composite layups 80 were cured to states of cure ranging between 69% and 94% and flexure was analyzed according to ASTM D7264. The results indicate ultimate flexural stress variation of less than 11% across the samples, ultimate flexural strain variation of less than 7% across the samples, and flexural modulus variation of less than 4% across the samples.

In another mechanical property test, the uncured thermoset composite layups 80 were cured to states of cure ranging from 72% to 93% and damage area was analyzed according to ASTM D7137 to assess damage due to impact. The results indicate that samples cured to a lower SOC generally exhibit less damage due to impact and thus may be more durable for handling within the factory when compared to fully cured thermoset composite layups.

In a fifth working example, uncured thermoset composite layups 80 were formed from a plurality of plies 82. The uncured thermoset composite layups 80 then were cured utilizing the systems and methods according to the present disclosure to achieve a SOC of 75% and 92%, respectively. The resulting TSCs again were cured with an example cure cycle to produce a SOC in excess of 92%. Note that the thermoset composite layups 80 were cured twice according to the aforementioned process to replicate a fully cured state of TSCs in a co-bonding process and thus to verify mechanical performance of the TSCs between two cases. The final TSCs were subject to 0-deg compression (ASTM D6641), open hole compression (ASTM D 6484) at room temperature ambient (RTA), 180° F. Dry and 180° F. Wet, 90-deg tension (ASTM D3039) and in-plane shear (ASTM 3518) tests. No significant mechanical performance differences were observed between the two cases (generally less than 6% variation across the various tests).

In a sixth working example, uncured thermoset composite layups 80 were formed from a plurality of plies 82. The uncured thermoset composite layups 80 then were cured utilizing the systems and methods according to the present disclosure to a SOC of 75% and 92%, respectively, to form a first TSC (with 75% SOC) and a second TSC (with 92% SOC). The resulting TSCs were combined with respective uncured thermoset composite layups 80, an adhesive and a partial release film, which was utilized during testing to initiate crack formation, to create a first and a second assembly, respectively. The assemblies were subjected to an example cure cycle producing a SOC in excess of 92% to manufacture first and second final TSC assemblies. The final TSC assemblies were subjected to fracture toughness tests at room temperature ambient (RTA) and 180° F. ambient (180° F./A) for double cantilever beam (DCB, ASTM D 5528) and end notch flexure (ENF, JIS K 7086, Japanese Industrial Standard Test Procedure) to verify performance between the two cases. The final TSC assemblies exhibited similar GIC (mode I fracture toughness) values. The first final TSC assembly (cured from 75% to 92%) exhibited higher GIIC (mode II fracture toughness) values.

In a seventh working example, uncured thermoset composite layups 80 were formed from a plurality of plies 82. Two assemblies each comprising two uncured thermoset composite layups 80 combined with a partial release film, which was once again utilized during testing to initiate crack formation. The two assemblies were cured utilizing the systems and methods according to the present disclosure to a SOC of 75% and 92%, respectively, to form a first TSC assembly (with 75% SOC) and a second TSC assembly (with 92% SOC). The TSC assemblies were subjected to an example cure cycle to produce a SOC in excess of 92% to manufacture first and second final TSC assemblies. The final TSC assemblies were subjected to fracture toughness tests at room temperature ambient (RTA) and 180° F. ambient (180° F./A) for double cantilever beam (DCB, ASTM D 5528) and end notch flexure (ENF, JIS K 7086, Japanese Industrial Standard Test Procedure) to verify performance between the two cases. The final TSC assemblies exhibited similar GIC and GIIC values.

Illustrative, non-exclusive examples of inventive subject matter according to the present disclosure are described in the following enumerated paragraphs:

A1. A method of co-bonding a first thermoset composite (TSC) and a second TSC to define a cured composite part, the method comprising:

partially curing the first TSC to a target state of cure (SOC) by heating the first TSC to define a first partially cured TSC, wherein the target SOC is established based, at least in part, on:

(i) a maximum temperature, during the partially curing, of the first TSC; and (ii) an elapsed time, during the partially curing, that an actual temperature of the first TSC is greater than a threshold temperature;

combining the first partially cured TSC with the second TSC to define a partially cured TSC assembly that includes an interface region between the first partially cured TSC and the second TSC; and heating the partially cured TSC assembly to:
(i) bond the first partially cured TSC to the second TSC within the interface region;
(ii) cure the partially cured TSC assembly; and
(iii) produce the cured composite part.

A2. The method of paragraph A1, wherein, prior to the combining, the first TSC includes a peel ply, wherein the peel ply at least partially, and optionally completely, covers a region of the first TSC that extends within the interface region between the first TSC and the second TSC in the partially cured TSC assembly, and further wherein the partially curing includes partially curing while the peel ply covers the region of the first TSC that extends within the interface region.

A3. The method of paragraph A2, wherein, prior to the combining, the method further includes separating the peel ply from the first TSC.

A4. The method of any of paragraphs A2-A3, wherein the peel ply includes, and optionally is, a polyester peel ply.

A5. The method of any of paragraphs A2-A4, wherein the partially curing includes at least one of:

(i) limiting the maximum temperature of the first TSC, optionally to decrease a potential for residue from the peel ply on the first TSC subsequent to separation of the peel ply from the first TSC; and (ii) limiting the elapsed time that the actual temperature of the first TSC is greater than the threshold temperature, optionally to decrease the potential for residue from the peel ply on the first TSC subsequent to separation of the peel ply from the first TSC.

A6. The method of any of paragraphs A1-A5, wherein the target SOC includes at least one of:

(i) a target percentage of crosslinking within a resin of the first TSC; and (ii) a target percent reaction conversion of the resin of the first TSC.

A7. The method of any of paragraphs A1-A6, wherein, when the first TSC has reached the target SOC, the first TSC is functionally similar to a comparable fully cured TSC.

A8. The method of any of paragraphs A1-A7, wherein, when the first TSC has reached the target SOC, the first TSC is functionally equivalent to a/the comparable fully cured TSC.

A9. The method of any of paragraphs A1-A8, wherein, when the first TSC has reached the target SOC, the first TSC at least one of:

(i) exhibits similar mechanical properties to a/the comparable fully cured TSC; and (ii) is a suitable replacement for the comparable fully cured TSC.

A10. The method of any of paragraphs A1-A9, wherein the partially curing includes, or instead includes:

(i) heating the first TSC to greater than a/the threshold temperature;

(ii) during the heating the first TSC, monitoring the actual temperature of the first TSC;

(iii) during the heating the first TSC, determining the maximum temperature achieved by the first TSC;

(iv) during the heating the first TSC, determining the elapsed time that the actual temperature of the first TSC is greater than the threshold temperature; and (iv) ceasing the heating the first TSC based, at least in part, on the maximum temperature of the first TSC and the elapsed time.

A11. The method of paragraph A10, wherein the ceasing the heating the first TSC is based, at least in part, on a relationship between the maximum temperature of the first TSC and the elapsed time.

A12. The method of any of paragraphs A10-A11, wherein the method further includes providing, for the target SOC of the first TSC, a process correlation, or calibration.

A13. The method of paragraph A12, wherein the process correlation describes combinations of the elapsed time and the maximum temperature of the first TSC that produce the target SOC.

A14. The method of paragraph A13, wherein a process correlation for a given target SOC differs from a process correlation for a different target SOC.

A15. The method of any of paragraphs A13-A14, wherein a process correlation for a given threshold temperature differs from a process correlation for a different threshold temperature.

A16. The method of any of paragraphs A13-A15, wherein the process correlation includes at least one of:

(i) a process correlation curve describing a functional relationship between values of the maximum temperature and corresponding values of the elapsed time that produce the target SOC;

(ii) a process correlation lookup table describing paired values of the maximum temperature and corresponding values of the elapsed time that produce the target SOC; and (iii) a process correlation function describing the functional relationship between values of the maximum temperature and corresponding values of the elapsed time that produced the target SOC.

A17. The method of any of paragraphs A13-A16, wherein at least one of:

(i) the process correlation is derived from semi-empirical models of the first TSC, cure kinetics of the first TSC, and heat transfer modeling of the first TSC;

(ii) the method further includes deriving the process correlation from semi-empirical models of the first TSC, cure kinetics of the first TSC, and heat transfer modelling of the first TSC;

(iii) the process correlation is derived experimentally; and (iv) the method further includes deriving the process correlation experimentally.

A18. The method of any of paragraphs A13-A17, wherein the ceasing the heating the first TSC includes ceasing responsive to the process correlation indicating that the first TSC has reached the target SOC.

A19. The method of any of paragraphs A13-A18, wherein the ceasing the heating the first TSC includes ceasing responsive to the elapsed time exceeding a threshold elapsed time, for the maximum temperature, that produces the target SOC.

A20. The method of any of paragraphs A13-A19, wherein the ceasing the heating the first TSC includes ceasing responsive to the maximum temperature exceeding a threshold maximum temperature, for the elapsed time, that produces the target SOC.

A21. The method of any of paragraphs A13-A20, wherein the providing the process correlation includes performing a plurality of thermal simulations, which include cure kinetic models, of the first TSC for a plurality of distinct process conditions and generating the process correlation from the plurality of thermal simulations, wherein each thermal simulation in the plurality of thermal simulations models curing of the first TSC to the target SOC.

A22. The method of paragraph A21, wherein the plurality of distinct process conditions includes at least one of:

(i) a plurality of different heated environment temperatures utilized during the heating the first TSC;

(ii) a plurality of different heat rates for the first TSC;

(iii) a plurality of different thicknesses for the first TSC;

(iv) a plurality of different heat transfer coefficients for the TSC, (v) a plurality of different thicknesses for a support mandrel that supports the first TSC during the heating the first TSC; and (vi) a plurality of different heat transfer coefficients for the support mandrel.

A23. The method of any of paragraphs A21-A22, wherein the plurality of thermal simulations is based, at least in part, on a cure kinetics and heat transfer model of the first TSC.

A24. The method of any of paragraphs A10-A23, wherein, prior to the heating the first TSC, the method further includes selecting an upper temperature threshold for the first TSC during the heating the first TSC, and further wherein the heating the first TSC includes maintaining the maximum temperature of the first TSC below the upper temperature threshold.

A25. The method of any of paragraphs A10-A24, wherein the heating the first TSC includes at least one of:

(i) heating the first TSC via convective heat transfer to the first TSC;

(ii) heating the first TSC via conductive heat transfer to the first TSC; and (iii) heating the first TSC via radiative heat transfer to the first TSC.

A26. The method of any of paragraphs A10-A25, wherein the heating the first TSC includes at least one of:

(i) heating the first TSC within an oven;

(ii) heating the first TSC within an autoclave; and (iii) heating a/the support mandrel that supports the first TSC during the heating the first TSC.

A27. The method of any of paragraphs A10-A26, wherein the heating the first TSC includes heating the first TSC within a heated environment, which surrounds the first TSC, by increasing a temperature of the heated environment.

A28. The method of any of paragraphs A10-A27, wherein the heating the first TSC includes exposing the first TSC to a heat source.

A29. The method of paragraph A28, wherein the heating the first TSC includes applying thermal energy to the first TSC with the heat source.

A30. The method of paragraph A29, wherein the ceasing the heating the first TSC includes ceasing application of the thermal energy to the first TSC with the heat source.

A31. The method of any of paragraphs A28-A30, wherein the heating the first TSC includes ramping a temperature of the heat source to a soak temperature and maintaining the temperature of the heat source at the soak temperature.

A32. The method of paragraph A31, wherein the soak temperature is at least one of:

(i) greater than the maximum temperature; and (ii) less than a/the upper temperature threshold.

A33. The method of any of paragraphs A31-A32, wherein the soak temperature is at least one of:

(i) at least 80° C., at least 90° C., at least 93.3° C., at least 100° C., at least 110° C., at least 120° C., at least 130° C., at least 140° C., at least 150° C., at least 160° C., at least 170° C., at least 179.4° C., at least 180° C., at least 190° C., or at least 200° C.; and (ii) at most 250° C., at most 225° C., at most 200° C., at most 190° C., at most 180° C., at most 170° C., at most 160° C., at most 150° C., at most 140° C., at most 130° C., at most 120° C., at most 110° C., at most 100° C., or at most 95° C.

A34. The method of any of paragraphs A10-A33, wherein the ceasing the heating the first TSC includes ceasing application of heat to the first TSC.

A35. The method of any of paragraphs A10-A34, wherein the ceasing the heating the first TSC includes decreasing a/the temperature of a/the heated environment, which surrounds the first TSC.

A36. The method of any of paragraphs A10-A35, wherein the monitoring the actual temperature of the first TSC includes monitoring with a temperature detector, optionally wherein the temperature detector includes at least one of:

(i) a thermocouple;

(ii) a resistance thermal detector; and (iii) an infrared temperature sensor.

A37. The method of any of paragraphs A10-A36, herein the monitoring the actual temperature of the first TSC includes at least one of:

monitoring a select temperature of a select location on the first TSC;

(i) monitoring a select temperature of a select location on the first TSC;

(ii) monitoring an average temperature of the first TSC; and (iii) monitoring a lowest measured temperature of the first TSC.

A38. The method of any of paragraphs A10-A37, wherein the monitoring the actual temperature of the first TSC includes monitoring a plurality of actual temperatures of the first TSC at a plurality of spaced-apart locations on the first TSC.

A39. The method of paragraph A38, wherein the maximum temperature of the first TSC is a lowest monitored temperature of the first TSC measured at a lowest temperature location of the plurality of spaced-apart locations on the first TSC.

A40. The method of any of paragraphs A10-A39, wherein the determining the elapsed time includes determining a time period that begins when the actual temperature of the first TSC exceeds the threshold temperature and ends when the ceasing the heating the first TSC is initiated.

A41. The method of any of paragraphs A1-A40, wherein at least one of:

(i) the combining includes applying an adhesive to the interface region prior to the heating the partially cured TSC assembly; and (ii) the combining includes combining without applying the adhesive to the interface region prior to the heating the partially cured TSC assembly.

A42. The method of any of paragraphs A1-A41, where, subsequent to the combining, the interface region is free of an/the adhesive extending between the first partially cured TSC and the second TSC.

A43. The method of any of paragraphs A1-A42, wherein, subsequent to the partially curing the first TSC and prior to the combining, the method further includes at least one of:

(i) trimming the first partially cured TSC;
(ii) inspecting the first partially cured TSC;
(iii) machining the first partially cured TSC; and
(iv) drilling at least one hole in the first partially cured TSC.

A44. The method of any of paragraphs A1-A43, wherein, subsequent to the partially curing the first TSC and prior to the combining, the method further includes cleaning a/the region of the first partially cured TSC that extends within the interface region between the first TSC and the second TSC in the partially cured TSC assembly.

A45. The method of paragraph A44, wherein the cleaning includes at least one of:

(i) removing a/the peel ply from the region of the first partially cured TSC;
(ii) plasma etching the region of the first partially cured TSC;
(iii) sanding the region of the first partially cured TSC; and
(iv) solvent wiping the region of the first partially cured TSC.

A46. The method of any of paragraphs A1-A45, wherein the heating the partially cured TSC assembly includes any suitable step of the heating the first TSC as described in any of paragraphs A10-A40.

A47. The method of any of paragraphs A1-A46, wherein the second TSC is uncured prior to the heating the partially cured TSC assembly.

A48. The method of any of paragraphs A1-A47, wherein the second TSC has less than a threshold SOC prior to the heating the partially cured TSC assembly, optionally wherein the threshold SOC is less than 50%, less than 40%, less than 30%, less than 20%, less than 10%, less than 5%, or less than 1%.

A49. The method of any of paragraphs A1-A48, wherein, prior to the combining, the method further includes partially curing the second TSC to a second target SOC to define a second partially cured TSC.

A50. The method of paragraph A49, wherein the second target SOC is established based, at least in part, on a maximum temperature, during the partially curing the second TSC, of the second TSC and on a second elapsed time, during the partially curing the second TSC, that a second actual temperature of the second TSC is greater than a second threshold temperature.

A51. The method of any of paragraphs A49-A50, wherein the partially curing the second TSC includes performing any suitable step of the partially curing the first TSC of any of paragraphs A1-A52.

A52. The method of any of paragraphs A1-A51, wherein, prior to the combining, the method further includes fully curing the second TSC.

A53. The method of any of paragraphs A1-A52, wherein, subsequent to the partially curing the first TSC and prior to the combining, the method further includes shielding the first partially cured TSC from ultraviolet light.

A54. The method of any of paragraphs A1-A53, wherein at least one, and optionally both, of the first TSC and the second TSC includes, and optionally is, a plurality of plies, or layered plies, of composite material.

A55. The method of any of paragraphs A1-A54, wherein at least one, and optionally both, of the first TSC and the second TSC includes, is, or is defined by a plurality of fibers and a thermoset resin.

A56. The method of paragraph A55, wherein the thermoset resin includes a thermoset epoxy.

A57. The method of any of paragraphs A1-A56, wherein the cured composite part includes at least one of:

(i) a skin-stringer structure;
(ii) an empennage of an aircraft; and
(iii) a wing of an aircraft.

A58. The method of any of paragraphs A1-A57, wherein, in the cured composite part, the first TSC defines one of a stringer and a skin and the second TSC defines the other of the stringer and the skin.

B1. The use of any of the methods of any of paragraphs A1-A57 to co-bond a first TSC and a second TSC.

C1. A cured composite part formed utilizing the method of any of paragraphs A1-A58.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of co-bonding a first thermoset composite (TSC) and a second TSC to define a cured composite part, the method comprising:
   partially curing the first TSC to a target state of cure (SOC) by heating the first TSC to define a first partially cured TSC, wherein the target SOC is established based, at least in part, on:
   (i) a maximum temperature, during the partially curing, of the first TSC; and
   (ii) an elapsed time, during the partially curing, that an actual temperature of the first TSC is greater than a threshold temperature;
   combining the first partially cured TSC with the second TSC to define a partially cured TSC assembly that includes an interface region between the first partially cured TSC and the second TSC; and
   heating the partially cured TSC assembly to:
   (i) bond the first partially cured TSC to the second TSC within the interface region;
   (ii) cure the partially cured TSC assembly; and
   (iii) produce the cured composite part.

2. The method of claim 1, wherein, prior to the combining, the first TSC includes a peel ply, wherein the peel ply at least partially covers a region of the first TSC that extends within the interface region between the first TSC and the second TSC in the partially cured TSC assembly, wherein the partially curing includes partially curing while the peel ply covers the region of the first TSC that extends within the interface region, and further wherein, prior to the combining, the method further includes separating the peel ply from the first TSC.

3. The method of claim 2, wherein the partially curing includes at least one of:
   (i) limiting the maximum temperature of the first TSC; and
   (ii) limiting the elapsed time that the actual temperature of the TSC is greater than the threshold temperature.

4. The method of claim 1, wherein the partially curing includes:
   (i) heating the first TSC to greater than the threshold temperature;
   (ii) during the heating the first TSC, monitoring the actual temperature of the first TSC;
   (iii) during the heating the first TSC, determining the maximum temperature achieved by the first TSC;
   (iv) during the heating the first TSC, determining the elapsed time that the actual temperature of the first TSC is greater than the threshold temperature; and
   (iv) ceasing the heating the first TSC based, at least in part, on the maximum temperature of the first TSC and the elapsed time.

5. The method of claim 4, wherein the ceasing the heating the first TSC is based, at least in part, on a relationship between the maximum temperature of the first TSC and the elapsed time.

6. The method of claim 4, wherein the method further includes providing, for the target SOC of the first TSC, a process correlation, wherein the process correlation describes combinations of the elapsed time and the maximum temperature of the first TSC that produce the target SOC.

7. The method of claim 6, wherein the ceasing the heating the first TSC includes ceasing responsive to the process correlation indicating that the first TSC has reached the target SOC.

8. The method of claim 6, wherein the providing the process correlation includes performing a plurality of thermal simulations, which include cure kinetic models, of the first TSC for a plurality of distinct process conditions and generating the process correlation from the plurality of thermal simulations, wherein each thermal simulation in the plurality of thermal simulations models curing of the first TSC to the target SOC.

9. The method of claim 1, wherein at least one of:
   (i) the combining includes applying an adhesive to the interface region prior to the heating the partially cured TSC assembly; and (ii) the combining includes combining without applying the adhesive to the interface region prior to the heating the partially cured TSC assembly.

10. The method of claim 1, where, subsequent to the combining, the interface region is free of an adhesive extending between the first partially cured TSC and the second TSC.

11. The method of claim 1, wherein, subsequent to the partially curing the first TSC and prior to the combining, the method further includes at least one of:
   (i) trimming the first partially cured TSC;
   (ii) inspecting the first partially cured TSC;
   (iii) machining the first partially cured TSC; and
   (iv) drilling at least one hole in the first partially cured TSC.

12. The method of claim 1, wherein, subsequent to the partially curing the first TSC and prior to the combining, the method further includes cleaning a region of the first TSC that extends within the interface region between the first TSC and the second TSC in the partially cured TSC assembly.

13. The method of claim 12, wherein the cleaning includes at least one of:
   (i) removing a peel ply from the region of the first partially cured TSC;
   (ii) plasma etching the region of the first partially cured TSC;
   (iii) sanding the region of the first partially cured TSC; and
   (iv) solvent wiping the region of the first partially cured TSC.

14. The method of claim 1, wherein the heating the partially cured TSC assembly includes heating within a heated environment, which surrounds the partially cured TSC assembly, by increasing a temperature of the heated environment.

15. The method of claim 1, wherein the second TSC is uncured prior to the heating the partially cured TSC assembly.

16. The method of claim 1, wherein the second TSC has less than a threshold SOC prior to the heating the partially cured TSC assembly, wherein the threshold SOC is less than 10%.

17. The method of claim 1, wherein, prior to the combining, the method further includes partially curing the second TSC to a second target SOC to define a second partially cured TSC.

18. The method of claim 17, wherein the second target SOC is established based, at least in part, on a second maximum temperature, during the partially curing the second TSC, of the second TSC and on a second elapsed time, during the partially curing the second TSC, that a second actual temperature of the second TSC is greater than a second threshold temperature.

19. The method of claim 1, wherein, prior to the combining, the method further includes fully curing the second TSC.

20. The method of claim 1, wherein the cured composite part includes at least one of:
   (i) a skin-stringer structure;
   (ii) an empennage of an aircraft; and
   (iii) a wing of an aircraft.

* * * * *